US012552577B2

(12) United States Patent
Castle

(10) Patent No.: US 12,552,577 B2
(45) Date of Patent: Feb. 17, 2026

(54) LOCKING BOTTOM BOX BLANKS, BOXES AND METHODS OF FORMING THE SAME

(71) Applicant: Georgia-Pacific Corrugated LLC, Atlanta, GA (US)

(72) Inventor: Matthew D. Castle, Chillicothe, OH (US)

(73) Assignee: Georgia-Pacific Corrugated LLC, Atlanta, GA (US)

(*) Notice: Subject to any disclaimer, the term of this patent is extended or adjusted under 35 U.S.C. 154(b) by 42 days.

(21) Appl. No.: 18/585,083

(22) Filed: Feb. 23, 2024

(65) Prior Publication Data

US 2024/0294299 A1 Sep. 5, 2024

Related U.S. Application Data

(60) Provisional application No. 63/449,108, filed on Mar. 1, 2023.

(51) Int. Cl.

| | |
|---|---|
| ***B65D 5/36*** | (2006.01) |
| ***B31B 50/26*** | (2017.01) |
| ***B31B 50/73*** | (2017.01) |
| ***B31B 100/00*** | (2017.01) |
| ***B31B 110/35*** | (2017.01) |
| ***B31B 120/30*** | (2017.01) |

(52) U.S. Cl.

CPC .......... *B65D 5/3621* (2013.01); *B31B 50/262* (2017.08); *B31B 50/732* (2017.08); *B31B 2100/00* (2017.08); *B31B 2110/35* (2017.08); *B31B 2120/302* (2017.08)

(58) Field of Classification Search

CPC ...... B65D 5/4266; B65D 5/4279; B65D 5/68; B65D 2571/00592; B65D 2571/00753; B65D 2571/00839; B65D 5/443

USPC .......... 229/100, 125, 150, 122.32, 126, 132, 229/155, 225, 237, 930

See application file for complete search history.

(56) References Cited

U.S. PATENT DOCUMENTS 2,522,597 A 9/1950 Blandford
2,718,998 A * 9/1955 Bemiss .................. B65D 5/305 229/930
2,901,158 A 8/1959 Frank
3,098,600 A * 7/1963 Hagan .................. B65D 5/0227 229/920
6,302,320 B1 * 10/2001 Stout ...................... B65D 71/36 229/117.13

(Continued)

*Primary Examiner* — Christopher R Demeree

(57) ABSTRACT

Box blanks, boxes, and corresponding methods of forming the same are provided. The box blank comprises a plurality of panels and bottom flaps. Each of the plurality of panels and the plurality of bottom flaps are connected along a foldable section score line. The plurality of panels are connected to the plurality of bottom flaps along a panel score line. At least one web pattern score extends in one of the plurality of bottom flaps comprising a first score line and a second score line extending within the bottom flap. A first subsection is defined between the second score line and the section score line, and a second subsection is defined between the first score line and the second score line. The at least one web pattern score enables folding such that the first subsection folds towards the second subsection when the box blank is being formed into the box.

22 Claims, 17 Drawing Sheets

(56) References Cited

U.S. PATENT DOCUMENTS

| | | | | |
|---|---|---|---|---|
| 2003/0116615 | A1* | 6/2003 | Hyatt | B65D 5/029 229/183 |
| 2018/0208350 | A1* | 7/2018 | Ertmer | B65D 5/0005 |

* cited by examiner

LOCKING BOTTOM BOX BLANKS, BOXES AND METHODS OF FORMING THE SAME

RELATED APPLICATIONS

This application claims priority to U.S. Provisional Application No. 63/449,108, filed on Mar. 1, 2023, which is incorporated by reference herein in its entirety.

FIELD OF THE INVENTION

Example embodiments of the present invention generally relate to paper-based (e.g., corrugate, paperboard, etc.) box designs and corresponding methods of manufacturing and methods of forming the boxes.

BACKGROUND

Box blanks may be formed of a web of material including, corrugate, paperboard, or other materials. The box blank comprises various cuts, cut outs, perforations, scores and/or compressions that aid in folding thereof and/or erecting a box therefrom. A box may be assembled by a user and/or with a box maker (e.g., a case erector).

Various box designs provide benefits depending on their desired usage. Some box blanks are designed to be easily erected by a user, such as prior to packing the newly erected box. For example, some boxes are designed to have a “locking” bottom that is formed when the user erects the box. Such a “locking” bottom may be secure for receiving items therein without additional tape or other securing features being required. Notably, however, current box designs with a “locking” bottom have limited strength for holding items therein. Further, material must be removed from the bottom flaps of the box to enable folding by a user. That material removal creates unnecessary scrap material that is wasteful and can clog various systems during the manufacturing process.

BRIEF SUMMARY

Various embodiments of the present invention are directed to box blanks (and corresponding boxes, methods of manufacturing, and methods of forming the boxes) that are designed to provide a “locking” bottom, where the box design provides improved strength and creates little to no scrap material during manufacturing. Further, erecting of the box by the user requires less time than currently available box designs with a “locking” bottom.

In some embodiments, the box blank may be formed with a die cut positioned on a machine (e.g., a die cutting press). When the die cut pattern requires holes in the box blank, the scrap material resulting from the cut may remain in the die cut or press itself rather than being ejected. The un-ejected scrap material must be manually removed, either from the die or the blank. Further, in addition to assembly and disassembly, any down time to repair or adjust the die cuts (e.g., due to scrap material) may reduce efficiency. Thus, the current “locking” bottom box designs create difficulties for high throughput manufacturing processes because they create too much scrap material.

Moreover, the cutouts of the box blanks of current “locking” bottom box designs reduce the amount of material used to create the bottom structure when the box blank is erected into a box. While the cutouts allow for easy erecting of the bottom structure, they also cause weakness within the bottom structure due to the lack of overlap of material throughout the structure, which may lead to ruptures of the bottom structure when items are placed therein.

In contrast, various embodiments of the present invention provide box blanks (and corresponding boxes, methods of manufacturing, and methods of forming the boxes) that reduce the amount of scrap material, and still improve the ease of formation and strength of the box. In some embodiments, rather than including multiple cut outs within the box blank, the box blank includes a plurality of scores that are arranged in score lines (which may be referred to as, for example, crease lines, lines of weakness, etc.) and/or cuts arranged so that the box blank is pliable, while not creating scrap material. For example, in some embodiments, one or more web pattern scores are created in one or more of the bottom flaps. The web pattern scores remove the need for cut-outs and enable ease of folding to occur during box erection by the user. Further, the retained material on the bottom, once formed into a box, provides increased strength. Moreover, retaining the material, instead of removing it as scrap, allows for formation of the box blanks in high throughput box manufacturing systems.

In an example embodiment a box blank for a box is provided. The box blank comprises a first section comprising at least a first panel and a first bottom flap connected along a first portion of a panel score line. The box blank further comprises a second section comprising at least a second panel and a second bottom flap connected along a second portion of the panel score line. The first section and the second section being connected along a first section score line. The box blank further comprises a third section comprising at least a third panel and a third bottom flap connected along a third portion of the panel score line. The second section and the third section being connected along a second section score line. The box blank further comprises a fourth section comprising at least a fourth panel and a fourth bottom flap connected along a fourth portion of the panel score line. The third section and the fourth section being connected along a third section score line. The box blank further comprises a flap comprising at least a flap panel and or a flap bottom connected along a flap portion of the panel score line. The flap is connected to either the first section or the fourth section along a fourth section score line. Each of the panel score line, the first section score line, the second section score line, the third section score lien and the fourth section score line are foldable. The pane score line intersects each of the first section score line, the second section score line, the third section score line, and the fourth section score line.

The box blank further comprises at least one web pattern score extending in one of the first bottom flap, the second bottom flap, the third bottom flap, or the fourth bottom flap. The at least one web pattern score comprises a first score line extending a first distance along the one of the first bottom flap, the second bottom flap, the third bottom flap, or the fourth bottom flap. The first score line extends at a first angle away from either one of the first section score line, the second section score line, the third section score line, or the fourth section score line or an intersection of the panel score line and one of the first section score line, second section score line, third section score line or the fourth section score line. The at least one web pattern score further comprises a second score line extending a second distance along one of the first bottom flap, the second bottom flap, the third bottom flap, or the fourth bottom flap. The second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line. the second angle is less than the first angle such that the first score line and the second score line form a web-like pattern that includes a first subsection between the second score line and one of the first section score line, the second section score line, the third section score line, or the fourth section score line and a second subsection between the first score line and the second score line. The web pattern score enables folding such that the first subsection folds towards the second subsection when the box blank is being formed into the box.

In some embodiments, the at least one web pattern score may be at least a first web pattern score and a second web pattern score. The first web pattern score may extend within the first bottom flap and the second web pattern score may extend within the third bottom flap.

In some embodiments, the at least one web pattern score may further comprise a third web pattern score extending within the fourth bottom flap. In some embodiments, the first score line of the first web pattern score may extend from one of either the intersection of the panel score line and the first section score line or the first section score line. A first score line of the second web pattern score may extend from one of either the intersection of the panel score line and the second section score line or the second section score line. A first score line of the third web pattern score may extend from one of either the intersection of the panel score line and the third section score line or the third section score line.

In some embodiments, the at least one web pattern score may further comprise a fourth web pattern score extending within the fourth bottom flap. A first score line of the fourth web pattern score may extend from one of either the intersection of the panel score line and the fourth section score line or the fourth section score line.

In some embodiments, the box blank may further comprise at least one adjacent face. The at least adjacent face may be on an opposing side if either the first section score line, the second section score line, the third section score line or the fourth section score line than the at least one web pattern score. In some embodiments, the first subsection and the second subsection may be in face-to-face contact with the at least one adjacent face with the box blank is formed into a box.

In some embodiments, the web pattern score may further comprise a hook defined by a through cut extending from the first score line and extending at least partially within the at least one bottom flap. In some embodiments, the hook may extend over at least one of the first section score line, the second section score lien the third section score line, the fourth section score line, the panel score line, or the intersection of the panel score line and one of the first section score line, the second section score line, the third section score line, or the fourth section score line.

In some embodiments, the at least one second score line may extend to an outer edge of one of the first bottom flap, the second bottom flap, the third bottom flap, or the fourth bottom flap. In some embodiments, the box blank may further comprise a tab defined by at least one cut extending partially within one of the first bottom flap, the second bottom flap, the third bottom flap, or the fourth bottom flap. The first score line of the at least one web pattern score may extend to the at least one cut defining the tab.

In some embodiments, the first section may further comprise a first tab defined by at least one cut extending at least partially from an outer edge of the first bottom flap into the first bottom flap. In some embodiments, the second section may further comprise a receiving tab defined by at least one cut extending at least partially from an outer edge of the second bottom flap into the second bottom flap. In some embodiments, the third section may further comprise a second tab defined by at least one cut extending at least partially from an outer edge of the third bottom flap into the third bottom flap. In some embodiments, the fourth section may further comprise a securing tab defined by at least one cut extending at least partially from an outer edge of the fourth bottom flap into the fourth bottom flap. In some embodiments, the receiving tab may be defined by a first cut and a second cut, and similarly the securing tab may be defined by a first cut and a second cut.

In some embodiments, the first section may further comprise a first top flap connected to the first panel along a first section of a top flap score line. In some embodiments, the second section may further comprise a second top flap connected to the second panel along a second section of the top flap score line. In some embodiments, the third section may further comprise a third top flap connected to the third panel along a third section of the top flap score line. In some embodiments, the fourth section may further comprise a fourth top flap connected to the fourth panel along a fourth section of the top flap score line. In some embodiments, the top flap score line may be foldable.

In some embodiments, the first subsection and the second subsection of the at least one web pattern score may come into proximate or face-to-face contact when the box is being formed into a box. In some embodiments, the first angle may be between the 30-60 degrees. In some embodiments, the second angle may be between 15-25 degrees. In some embodiments, the first distance may be greater than the second distance. In some embodiments, the section score line may comprise a perforated portion and a through cut portion. In some embodiments, the first score line may comprise a first section and a second section. The first section may comprise perforations, and the second section may comprise a through cut. In some embodiments, the second section of the first score line may extend into a hook. In some embodiments, the flap may comprise the flap panel and the flap bottom.

In another example embodiment a method of forming a box is provided. The method comprises providing a blank. The blank comprises a first section comprising at least a first panel and a first bottom flap connected along a first portion of a panel score line. The blank further comprises a second section comprising at least a second panel and a second bottom flap connected along a second portion of the panel score line. The first section and the second section being connected along a first section score line. The blank further comprises a third section comprising at least a third panel and a third bottom flap connected along a third portion of the panel score line. The second section and the third section being connected along a second section score line. The blank further comprises a fourth section comprising at least a fourth panel and a fourth bottom flap connected along a fourth portion of the panel score line. The third section and the fourth section being connected along a third section score line. The blank further comprises a flap comprising at least a flap panel and or a flap bottom connected along a flap portion of the panel score line. The flap is connected to either the first section or the fourth section along a fourth section score line. Each of the panel score line, the first section score line, the second section score line, the third section score lien and the fourth section score line are foldable. The pane score line intersects each of the first section score line, the second section score line, the third section score line, and the fourth section score line.

The blank further comprises at least one web pattern score extending in one of the first bottom flap, the second bottom flap, the third bottom flap, or the fourth bottom flap. The at least one web pattern score comprises a first score line extending a first distance along the one of the first bottom flap, the second bottom flap, the third bottom flap, or the fourth bottom flap. The first score line extends at a first angle away from either one of the first section score line, the second section score line, the third section score line, or the fourth section score line or an intersection of the panel score line and one of the first section score line, second section score line, third section score line or the fourth section score line. The at least one web pattern score further comprises a second score line extending a second distance along one of the first bottom flap, the second bottom flap, the third bottom flap, or the fourth bottom flap. The second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line. the second angle is less than the first angle such that the first score line and the second score line form a web-like pattern that includes a first subsection between the second score line and one of the first section score line, the second section score line, the third section score line, or the fourth section score line and a second subsection between the first score line and the second score line. The web pattern score enables folding such that the first subsection folds towards the second subsection when the box blank is being formed into the box. The method further comprises adhering the flap to the first section to form a four walled structure.

In some embodiments, the method may further comprise folding the second bottom flap towards a center of the four walled structure. The method may further comprise folding the first bottom flap towards the center of the four walled structure, such that a portion of the first bottom flap is in face-to-face contact with the second bottom flap. The method may further comprise folding the third bottom flap towards the center of the four walled structure, such that a portion of the third bottom flap is in face-to-face contact with the second bottom flap. The method may further comprise folding the fourth bottom flap towards the center of the four walled structure, such that a first portion of the fourth bottom flap is in face-to-face contact with the first bottom flap and a second portion of the fourth bottom flap is in face-to-face contact with the third bottom flap. The method may further comprise tucking a tab portion of the fourth bottom flap below a receiving portion of the second bottom flap.

In yet another example embodiment a box formed from a box blank is provided. The box comprises a first section comprising at least a first wall and a first bottom flap connected along a first portion of a panel score line. The box further comprises a second section comprising at least a second wall and a second bottom flap connected along a second portion of the panel score line. The first section and the second section are connected along a first section score line. The box further comprises a third section comprising at least a third wall and a third bottom flap connected along a third portion of the panel score line. The second section and the third section are connected along a second section score line. The box further comprises a fourth section comprising at least a fourth wall and a fourth bottom flap connected along a fourth portion of the panel score line. The third section and the fourth section are connected along a third section score line. The box further comprises at least one of a flap wall or a flap bottom connected along a flap portion of the panel score line. The flap is connected to either the first section or the fourth section along a fourth section score line. Each of the panel score line, the first section score line, the second section score line, the third section score line, and the fourth section score line are foldable. The panel score line intersects each of the first section score line, the second section score line, the third section score line, and the fourth section score line.

The box further comprises at least one web pattern score extending in one of the first bottom flap, the second bottom flap, the third bottom flap, or the fourth bottom flap. The web pattern score comprises a first score line extending a first distance along the one of the first bottom flap, the second bottom flap, the third bottom flap, or the fourth bottom flap. The first score line extends at a first angle away from either one of the first section score line, the second section score line, the third section score line, or the fourth section score line or an intersection of the panel score line and one of the first section score line, second section score line, third section score line or the fourth section score line. The at least one web pattern score further comprises a second score line extending a second distance along one of the first bottom flap, the second bottom flap, the third bottom flap, or the fourth bottom flap. The second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line. the second angle is less than the first angle such that the first score line and the second score line form a web-like pattern that includes a first subsection between the second score line and one of the first section score line, the second section score line, the third section score line, or the fourth section score line and a second subsection between the first score line and the second score line. The web pattern score enables folding such that the first subsection folds towards the second subsection when the box blank is being formed into the box. Each of the first bottom flap, the second bottom flap, the third bottom flap, and the fourth bottom flap are folded along the panel score line to form a continuous bottom web.

In yet another example embodiment a box blank is provided. The box blank comprises a plurality of panels including at least a first panel, as second panel, a third panel, and a fourth panel. Each of the panels is connected to the adjacent panel at a section score line portion, each section score line portion being foldable. The box blank further comprises a flap extending from either the first panel or the fourth panel. The box blank further comprises a plurality of bottom flaps. The plurality of bottom flaps extend from the plurality of panels along a panel score line. The plurality of bottom flaps define at least one web pattern score. The at least one web pattern score comprises a first score line and a second score line. The plurality of bottom flaps are foldable along the panel score line, utilizing the first score line and the second score line to form a continuous bottom web when the box blank is formed into a box.

In yet another example embodiment a box formed from a box blank is provided. The box comprises a plurality of walls including at least a first wall, a second wall, a third wall, and fourth wall. Each of the walls is connected to an adjacent wall at a foldable section score line portion. The box further comprises a flap extending from either the first wall or the fourth wall, and the flap is adhered to either the first wall or the fourth wall. The box further comprises a plurality of bottom flaps. The plurality of bottom flaps extend from the plurality of walls along a panel score line. The plurality of bottom flaps define at least one web pattern score comprising a first score line and a second score line. When the plurality of bottom flaps are folded along the panel score line utilizing the first score line and the second score line thereby forming a continuous web bottom. The continuous web bottom extending between and perpendicular to the plurality of walls.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
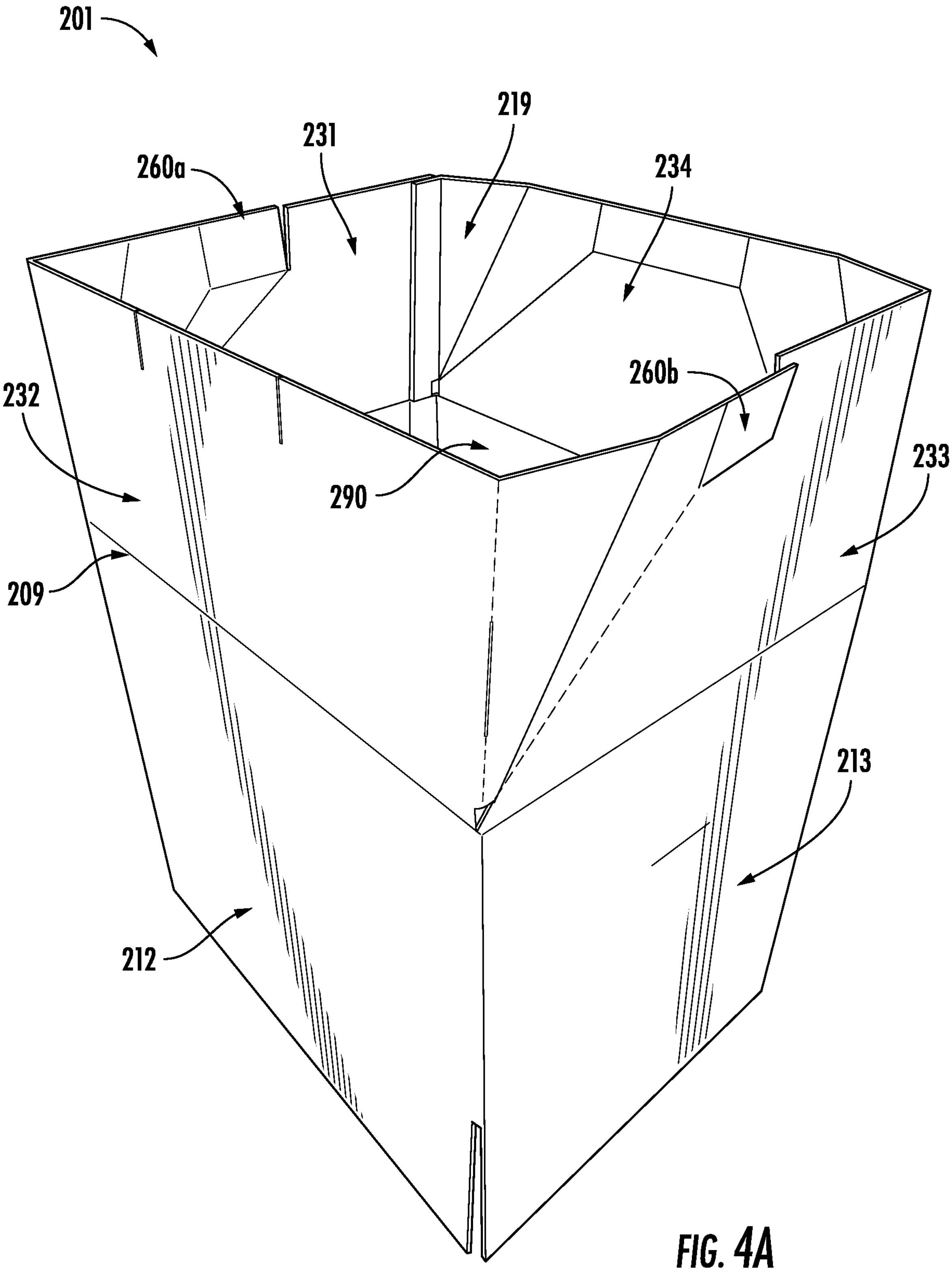
Figure 4B:
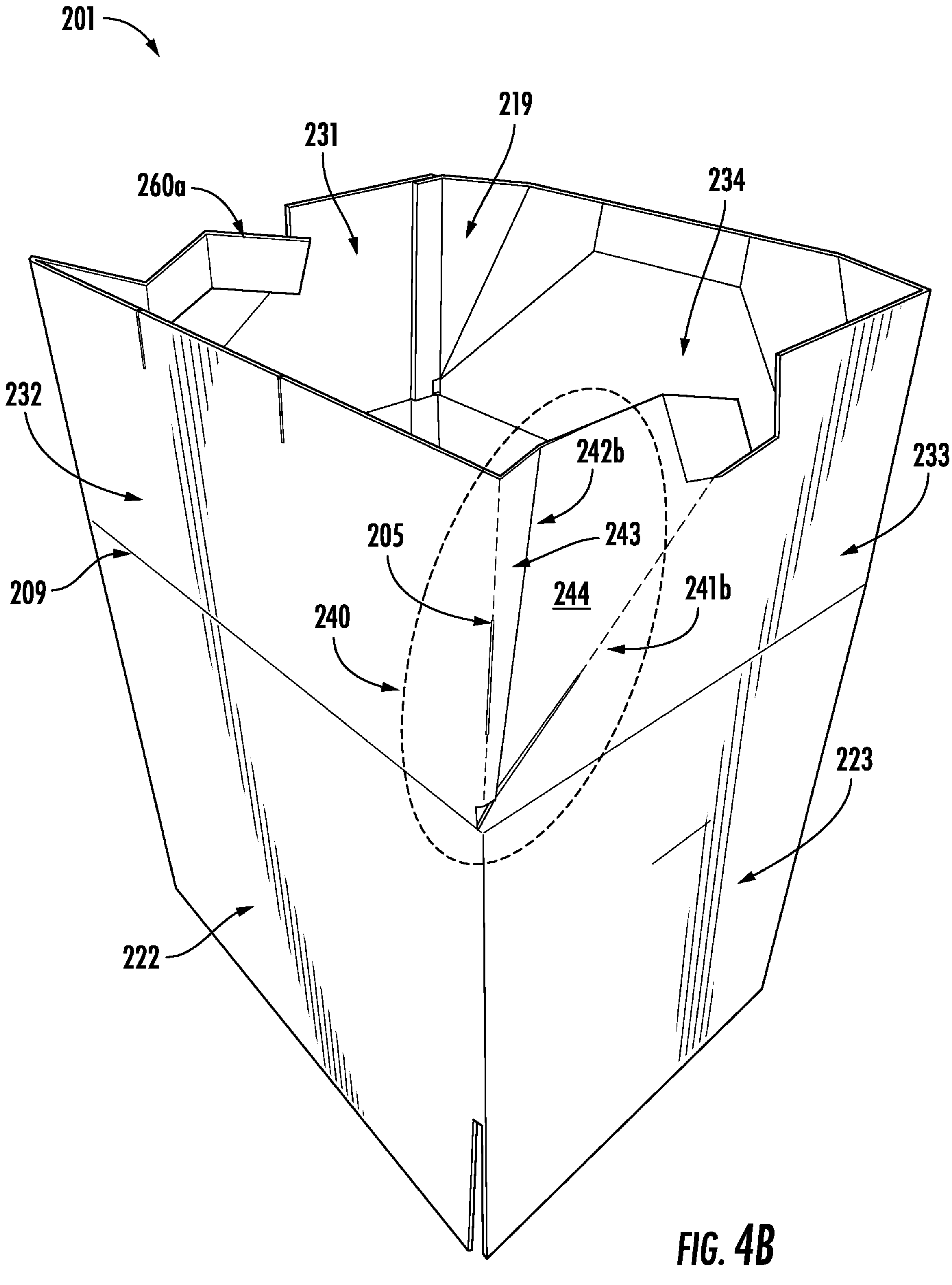
Figure 4C:
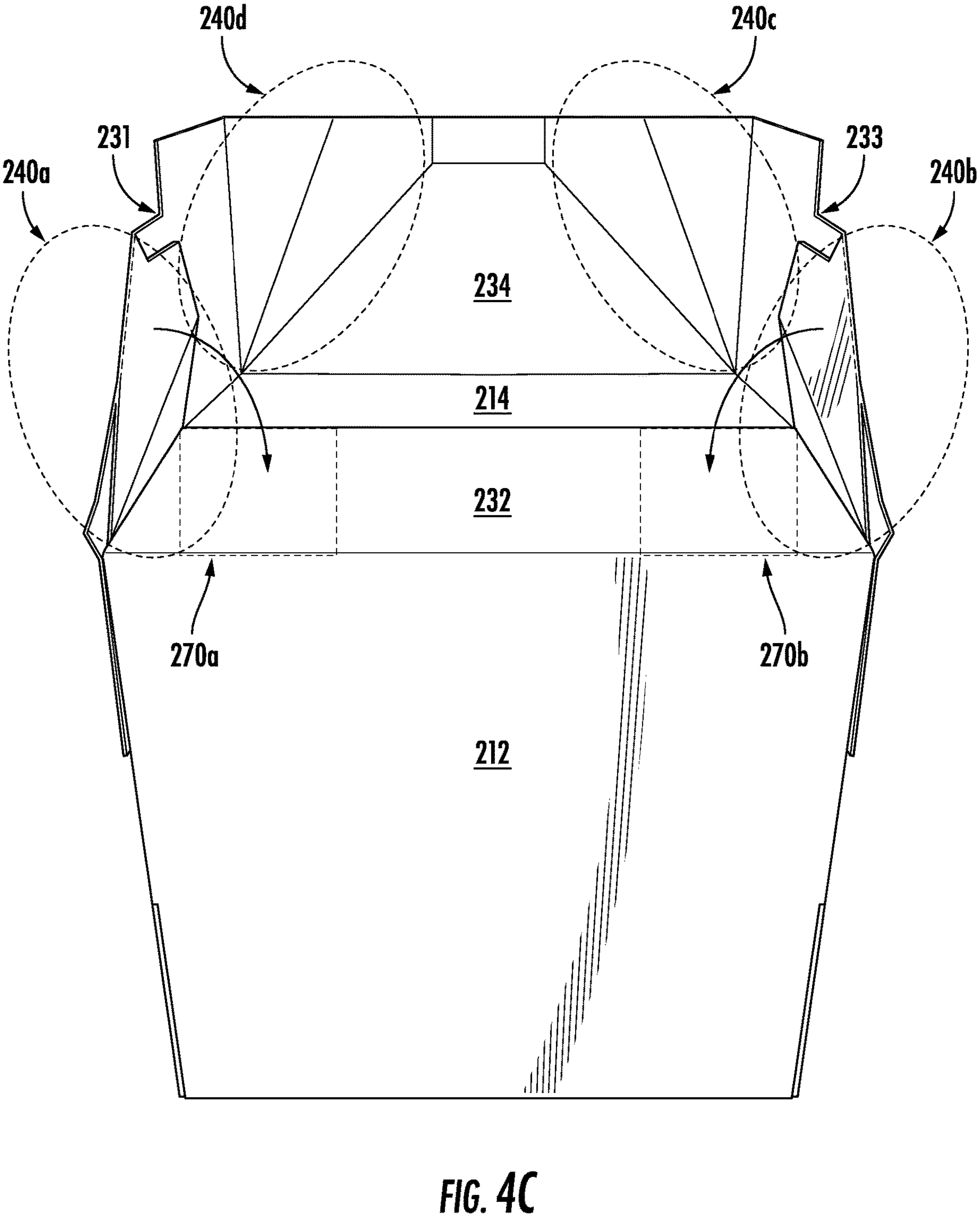
Figure 4D:
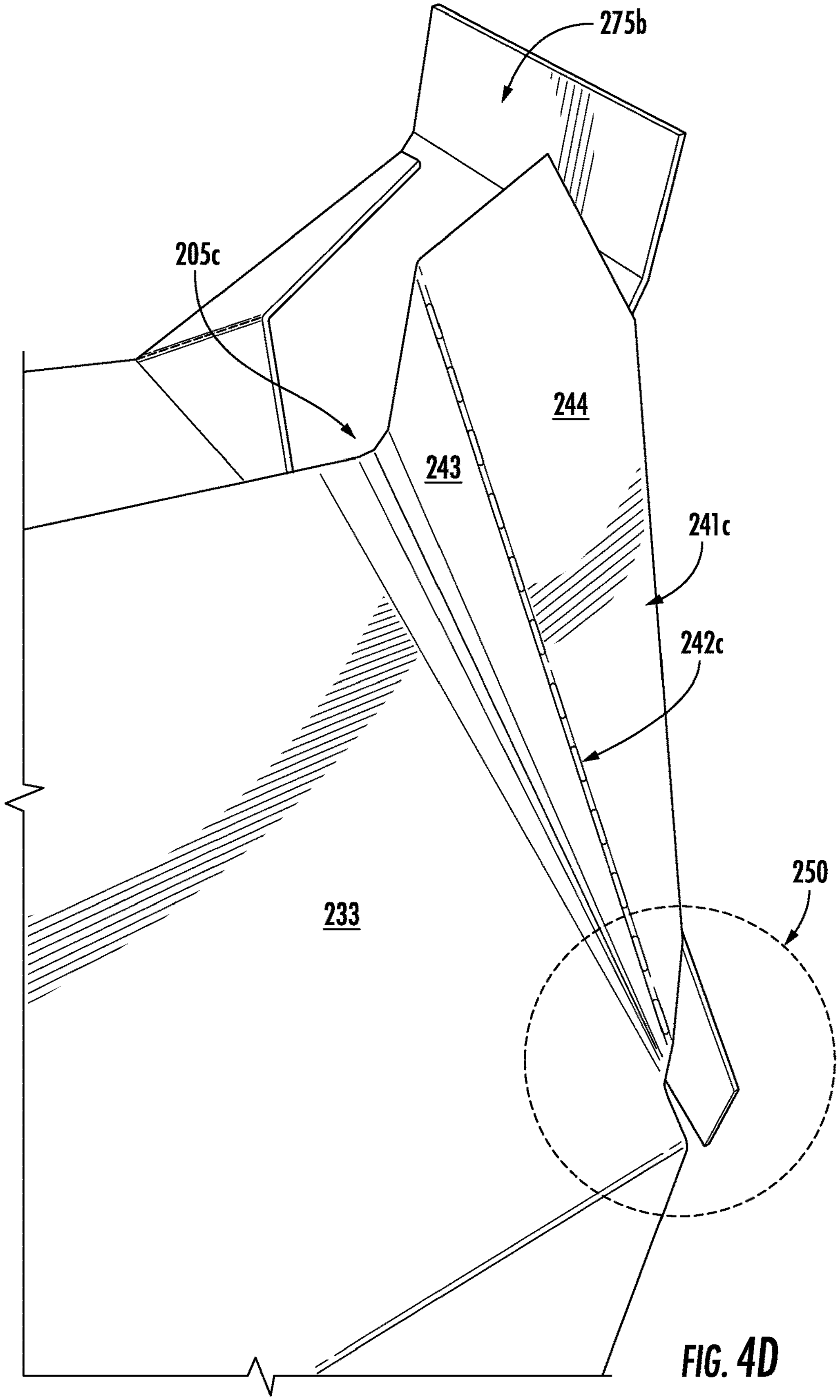
Figure 4E:
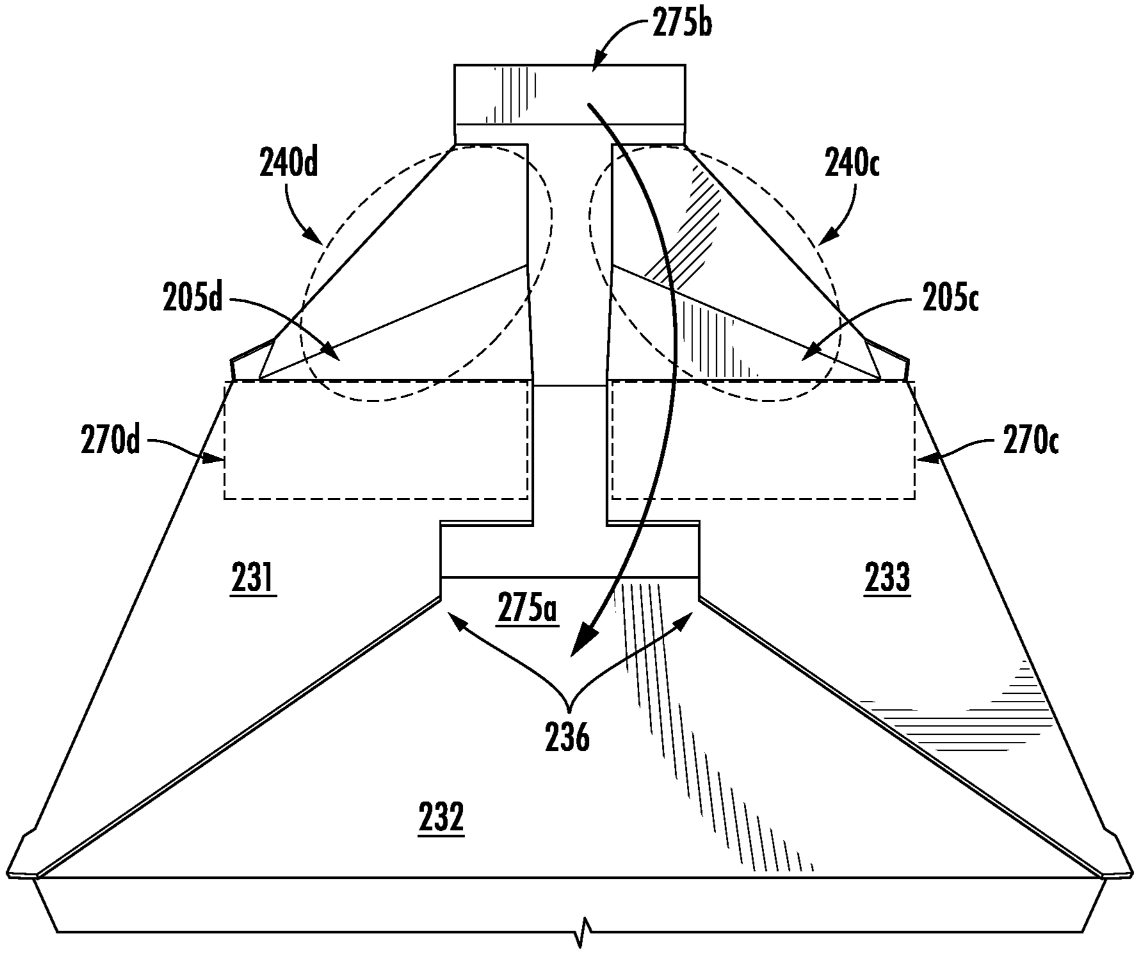
Figure 4F:
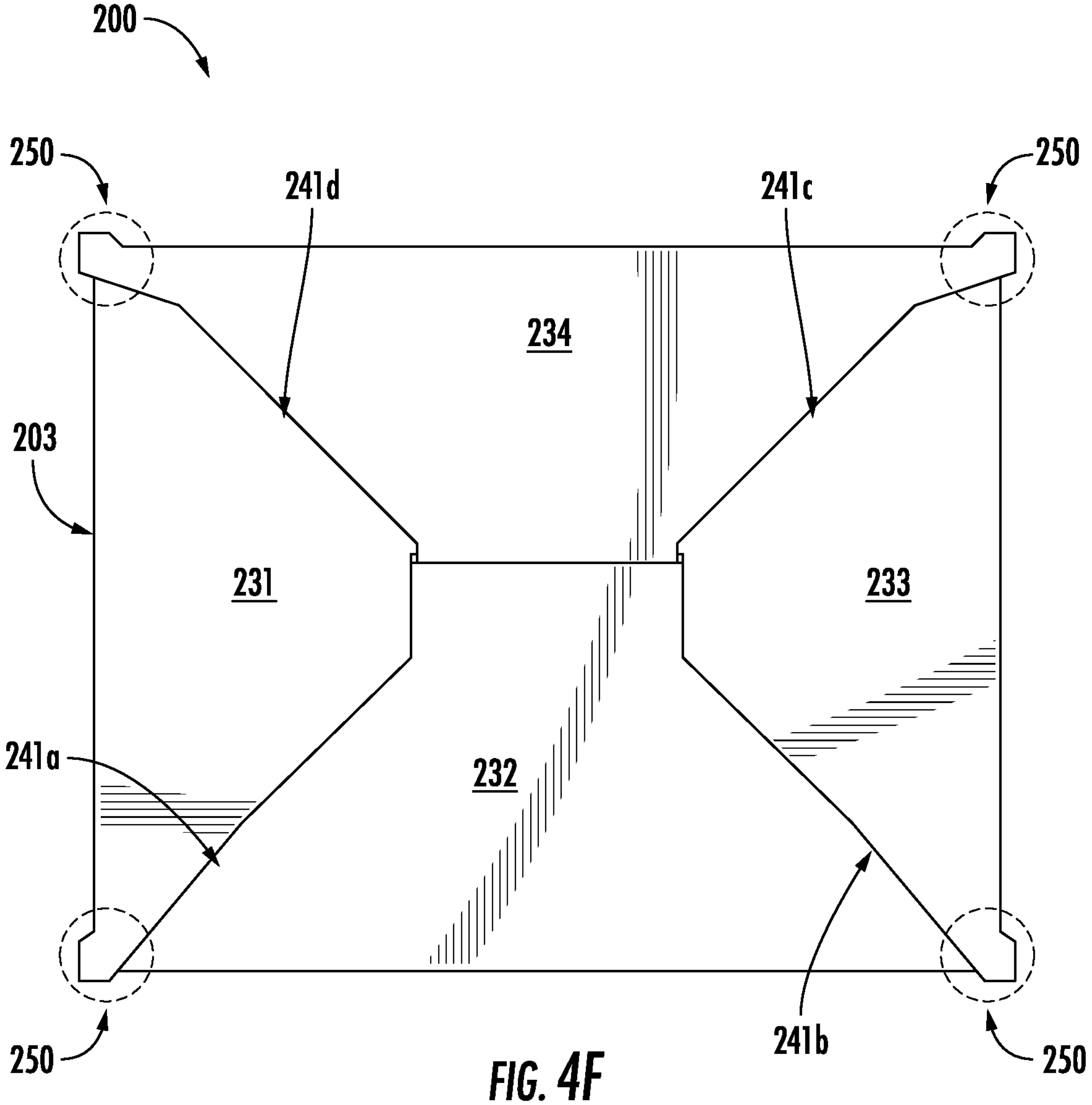
Figure 5:
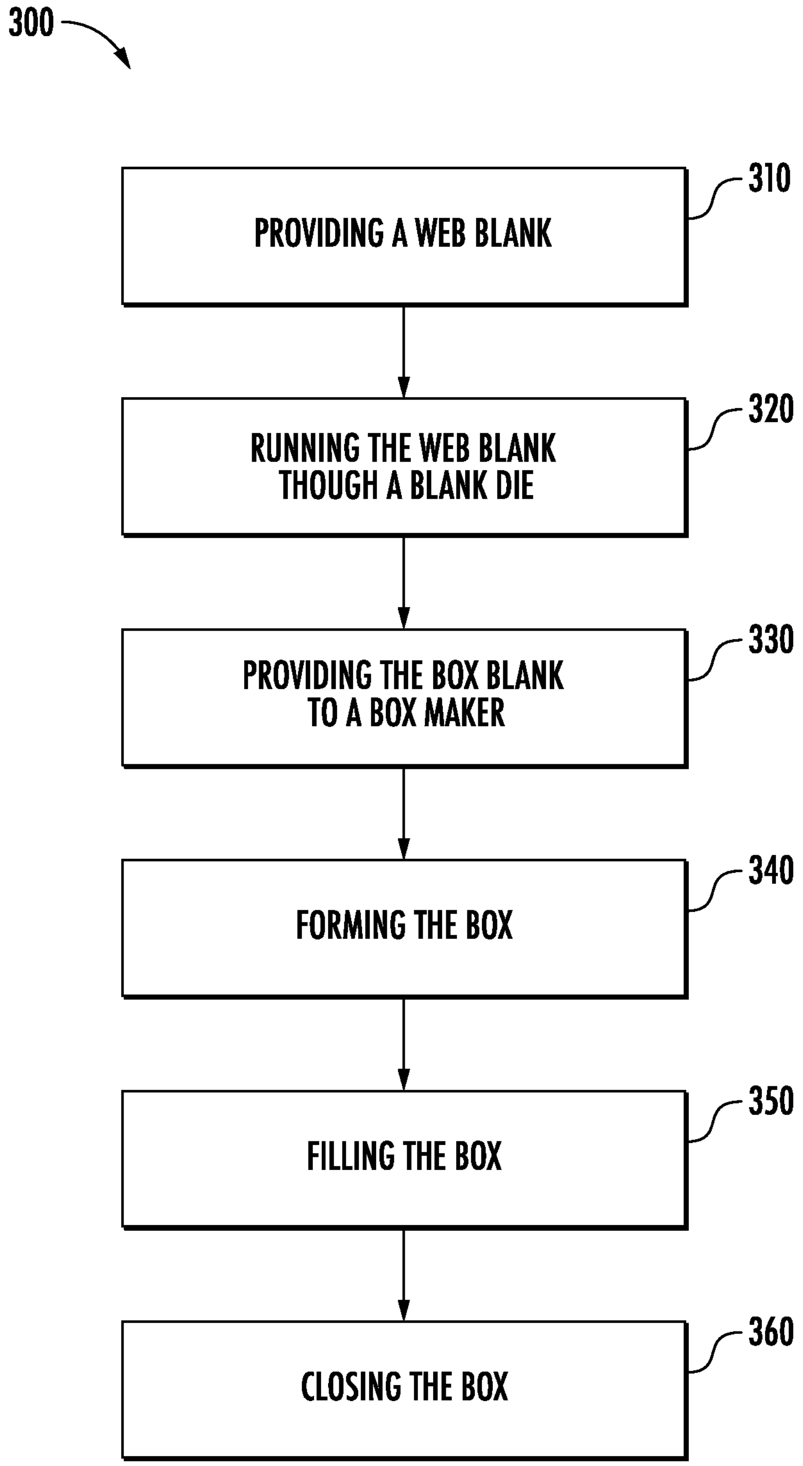

FIGS. 3A-F illustrate various configurations of example web pattern scores, in accordance with some embodiments discussed herein;

FIGS. 4A-F illustrate a perspective view of formation of an example bottom structure of a box, in accordance with some embodiments discussed herein; and FIG. 5 illustrates a flowchart of an example method of forming a box blank, and forming a box from the box blank, in accordance with some embodiments discussed herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Notably, while some embodiments describe various positional qualifiers for various features, such as "top", "bottom", "front", "back", "side", etc. embodiments described herein are not meant to be limited to such qualifiers unless otherwise stated. Directional qualifiers herein are generally used to aid in describing the invention in the context of the drawings and/or description but are not otherwise intended to be limiting.

While some embodiments describe a "user", use of such a term herein is not meant to be limited to a person or a single person, as the "user" may be an end user, a consumer, a manufacturer, among other types of users along a supply chain in relation to the box design. Further, when utilizing the word "user", the actor(s) may be operating one or more machines/system that cause the intended function (e.g., forming the box blank or converting the box blank to a box).

Figure 1A:
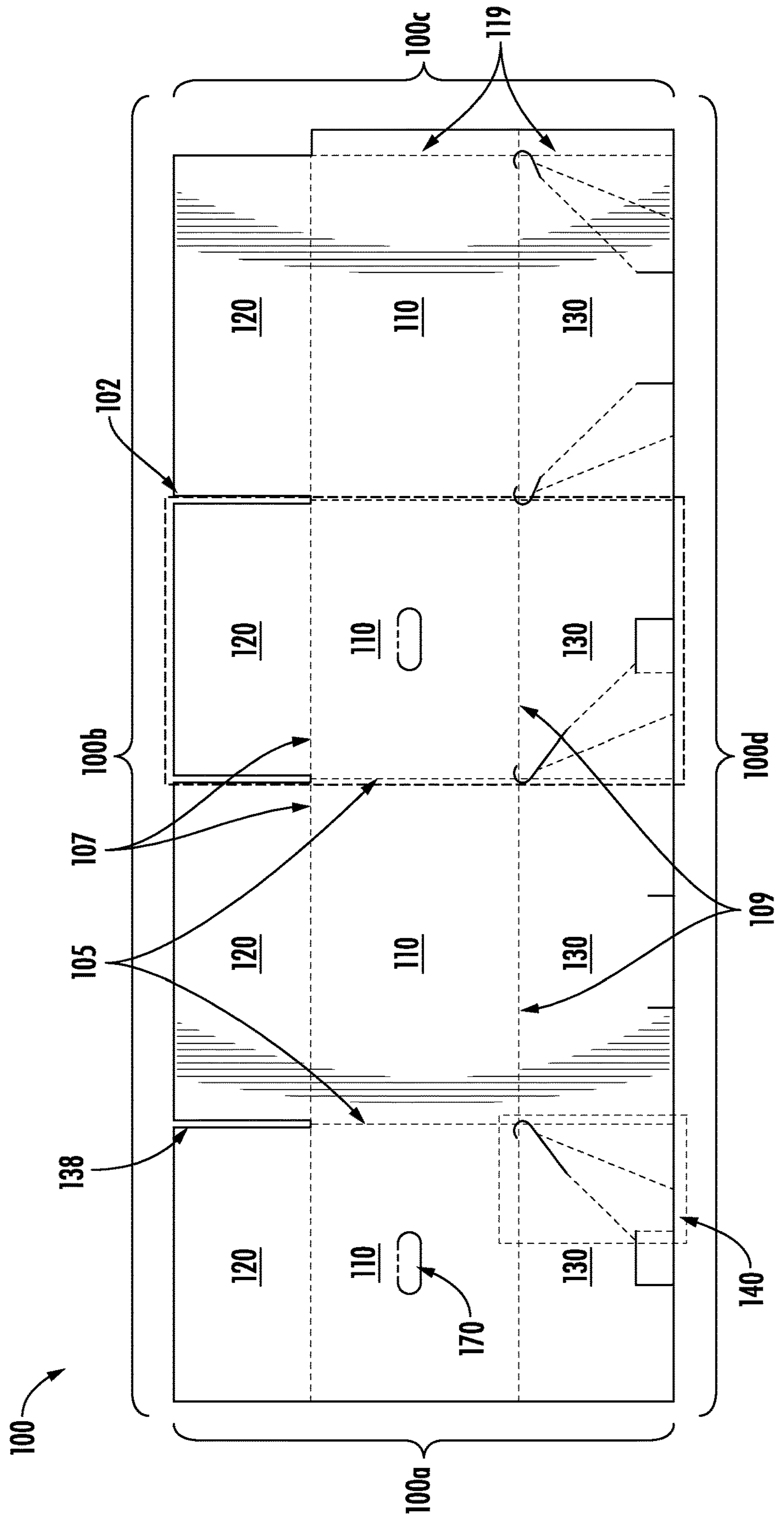
FIG. 1A illustrates an example box blank, in accordance with some embodiments discussed herein.

An example box blank 100 is shown in FIG. 1A. With reference to FIGS. 1A-2B, the box blank 100 is formed of a continuous piece of material, the box blank comprising a plurality of panels 110, a plurality of top flaps 120, a plurality of bottom flaps 130 and a flap 119. The box blank 100 may comprise a first outer edge 100*a*, a second outer edge 100*b*, a third outer edge 100*c*, and a fourth outer edge 100*d*, defining an outer periphery of the box blank 100. In some embodiments, the fourth outer edge 100*d* may be parallel to the second outer edge 100*d* and may be perpendicular to both the first outer edge 100*a* and the third outer edge 100*c*. In some embodiments, the second outer edge 100*b* may comprise a plurality of gaps 138 such that in some embodiments the second outer edge 100*b* may not be continuous. Additionally, in some embodiments, the flap 119 may define a portion of the third outer edge 100*c* and may not extend from the fourth outer edge 100*d* to the second outer edge 100*b*.

Notably, in some embodiments, the box blank 100 may be processed through one or more manufacturing systems at various stages, such as described herein. For example, in some embodiments, the box blank 100 may be formed from a web of corrugated material which may be cut into the box blank 100. Thereafter, the box blank 100 may be further processed through a die cut to form desired cuts, scores, and/or impressions thereon. Further, the box blank 100 may be passed through a box maker to form the box and/or an intermediate state of the box. In other embodiments, the box blank 100 may be formed of paperboard or other materials.

In some embodiments, the box blank 100 may comprise multiple adjacent sections 102, each comprising one of the plurality of panels 110, one of the plurality of top flaps 120 and one of the plurality of bottom flaps 130.

In some embodiments, the plurality of panels 110 correspond to walls of a formed box (corresponding walls can be seen in the box form 200 illustrated in FIGS. 4A-F). In this regard, the term "panels" may be used when in a box blank form and the term "walls" may be used when in the erected/formed box form, although such differentiation in terminology is not required for an understanding of what is being described or claimed. Similarly, the plurality of bottom flaps 130 may correspond to the bottom structure (e.g., corresponding bottom structure 203 can be seen in the box form 200 illustrated in FIGS. 4A-F).

In some embodiments, the plurality of top flaps 120 may be connected to the plurality of panels 110 along a top flap score line 107. In some embodiments, the top flap score line 107 may be continuous between the first outer edge 100*a* and the third outer edge 100*c*. In some embodiments, the box blank 100 may be foldable along the top flap score line 107.

In some embodiments, the plurality of panels 110 may be connected to the plurality of bottom flaps 130 along a bottom flap score line 109. The plurality of bottom flaps 130 may be positioned opposite the plurality of top flaps 120. In some embodiments, the bottom flap score line 109 may be continuous between the first outer edge 100*a* and the third outer edge 100*c*. In some embodiments, the box blank 100 may be foldable along the bottom flap score line 109.

In some embodiments, a pattern web score 140 may be formed within one of the plurality of bottom flaps 130 and may assist in erecting the plurality of bottom flaps 130 into a bottom of the formed box (e.g., FIG. 4F).

Adjacent sections 102 may be connected via a corresponding section score line 105. In some embodiments, each section score line 105 may be continuous between the adjacent panels and adjacent bottom flaps. In this regard the section score line 105 may be continuous between the fourth outer edge 100*d* and the second outer edge 100*b*, or the gaps 138 when the second outer edge 100*b* is discontinuous. In some embodiments, the sections 102 of the box blank 100 may be foldable about the section score line 105. As used herein, the term "score" may be used to describe a compression of the internal support system of the blank without creating a cut therethrough, while in other embodiments the term "score" may include a weakness, perforations and/or a cut extending through the blank 100.

In some embodiments, one or more of the plurality of panels 110 may comprise a handle 170 disposed in the body of the panel 110. In some embodiments, the handle 170 may be defined by a through cut along a portion of the handle 170, and an uncut portion. Thus, the handle may be shifted from the plane of the box blank 100 and may be foldable along the uncut portion. In some embodiments, the uncut portion may be a score line, without through cuts. In some embodiments, the handle 170 may be fully scored about the perimeter of the handle. In this regard, the handle may be removed from the box blank 100 after formation of the box. In another embodiment, the handle 170 may be formed of a score line, without a through cut about the perimeter. In such example embodiments more force may be required to remove the handle from the plane of the box blank 100.

Figure 1B:
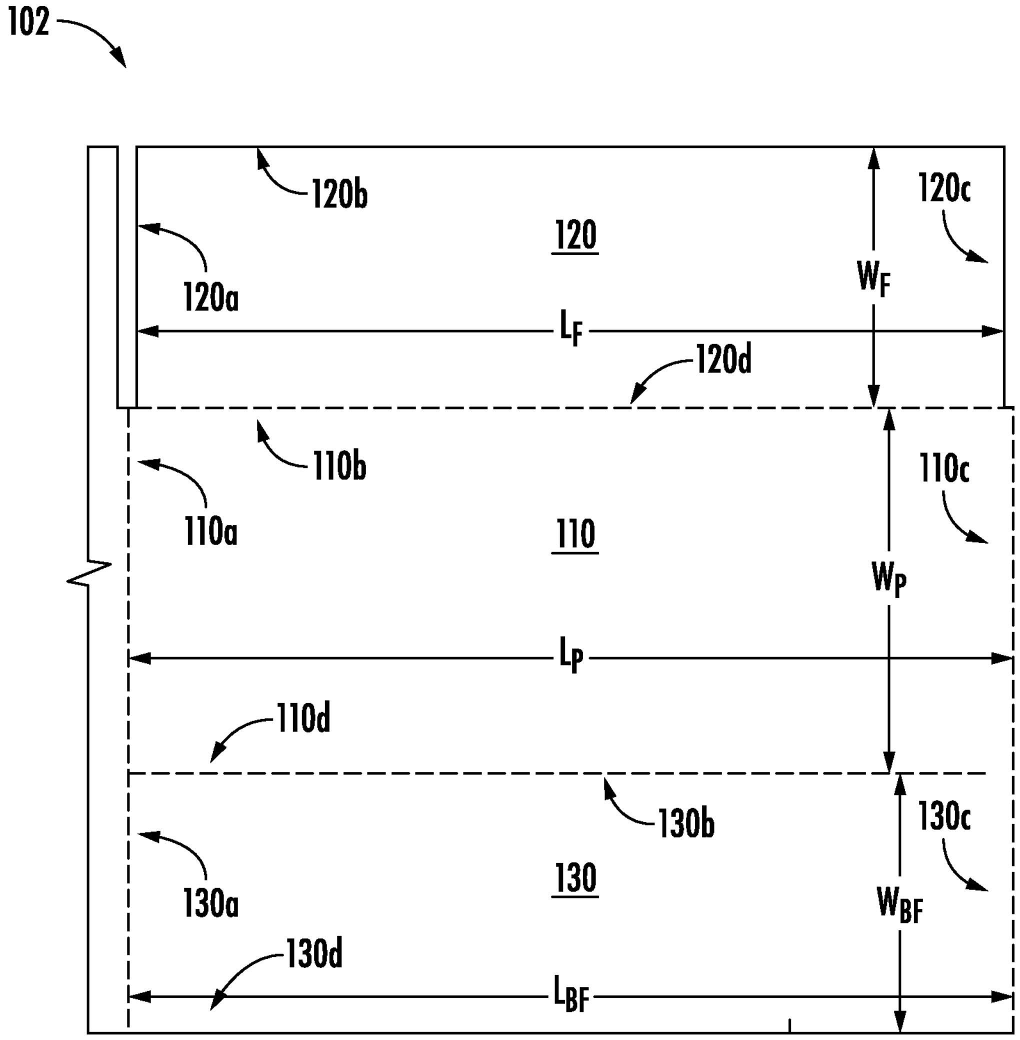
FIG. 1B illustrates an example section of the box blank shown in FIG. 1A, in accordance with some embodiments discussed herein.

FIG. 1B illustrates an example section 102 of the box blank 100. Each section 102 of the box blank comprises one of the plurality of panels 110, one of the plurality of top flaps 120 and one of the pluralities of bottom flaps 130. In some embodiments, each of the plurality of panels 110 comprises a first edge 110*a*, a second edge 110*b*, a third edge 110*c*, and a fourth edge 110*d*. In some embodiments, the first edge 110*a* and the third edge 110*c* are parallel, and the first edge 110*a* is perpendicular to each of the second edge 110*b* and the fourth edge 110*d*. Similarly, each of the plurality of top flaps 120 comprises a first edge 120*a*, a second edge 120*b*, a third edge 120*c*, and a fourth edge 120*d*. In some embodiments, the first edge 120*a* and the third edge 120*c* are parallel, and the first edge 120*a* is perpendicular to each of the second edge 120*b* and the fourth edge 120*d*. Likewise, the plurality of bottom flaps 130 each comprise a first edge 130*a*, a second edge 130*b*, a third edge 130*c*, and a fourth edge 130*d* and the first edge 130*a* and the third edge 130*c* are parallel, while the first edge 130*a* is perpendicular to each of the second edge 130*b* and the fourth edge 130*d*.

As noted above, the box blank 100 and, thus, each section 102 are formed of a continuous piece of material. In this regard, the second edge 110*b* of the plurality of panels 110 and the fourth edge 120*d* of the plurality of top flaps 120 are the same edge, and the fourth edge 110*d* of the plurality of panels 110 and the second edge 130*b* of the plurality of bottom flaps 130 are the same edge. Said differently, the second edge 110*b* of the plurality of panels is coextensive with the fourth edge 120*d* of the plurality of top flaps 120, and the fourth edge 110*d* of the plurality of panels 110 is coextensive with the second edge 130*b* of the plurality of bottom flaps 130.

In some embodiments, each of the plurality of panels 110 defines a panel length $L_P$, wherein the panel length $L_P$ extends between the first edge 110*a* and the third edge 110*c*. In some embodiments, the panel length $L_P$ is between 8-20 in, 9-19 in, or 10-18 in. In some embodiments, each of the plurality of panels 110 defines a panel width $W_P$ extending between the second edge 110*b* and the fourth edge 110*d* of the panel. In some embodiments, the panel width $W_P$ is between 5-10 in, between 6-9 in, or between 7-8 in. In some embodiments, each of the plurality of panels 110 defines the same panel width $W_P$. In some embodiments, each of the plurality of panels 110 defines the same panel length $L_P$, while in other embodiments the plurality of panels 110 may alternate panel lengths $L_P$. For example, in an example embodiment, adjacent panels may define different panel lengths $L_P$, while alternating panels may define the same panel lengths $L_P$.

In some embodiments, each of the plurality of bottom flaps 130 defines a bottom flap length $L_{BF}$, wherein the bottom flap length $L_{BF}$ extends between the first edge 130*a* and the third edge 130*c*. In some embodiments, the bottom flap length $L_{BF}$ is between 8-20 in, 9-19 in, or 10-18 in. In some embodiments, the bottom flap length $L_{BF}$ is equal to the panel length $L_P$ of the corresponding panel of the plurality of panels 110.

In some embodiments, each of the plurality of bottom flaps 130 defines a bottom flap width $W_{BF}$, extending between the second edge 130*b* and the fourth edge 130*d*. In some embodiments, the bottom flap width $W_{BF}$ is between 3-8 in, between 4-7 in, or between 5-6 in. In some embodiments, each of the plurality of bottom flaps 130 defines an equal bottom flap width $W_{BF}$, while the bottom flap length $L_{BF}$ changes across the plurality of bottom flaps 130 corresponding to the panel length $L_P$ of the corresponding panel of the plurality of panels 110.

In some embodiments, each of the plurality of top flaps 120 defines a top flap length $L_F$, wherein the top flap length $L_F$ extends from the first edge 120*a* to the third edge 120*c*. In some embodiments, the top flap length $L_F$ is between 8-20 in, 9-19 in, or 10-18 in. In some embodiments, the top flap length $L_F$ is equal to the panel length $L_P$ of the corresponding panel of the plurality of panels 110. In some embodiments, the top flap length $L_F$ is equal to the panel length $L_P$, while in other embodiments the top flap length $L_F$ is smaller than the panel length $L_P$. In this regard, the gap 138 between the plurality of top flaps 120 comprises the difference in length between the top flap length $L_F$ and the panel length $L_P$. In some embodiments, the gap 138 is between 1/32-1/8 in, more particularly between 1/16-1/8 in, while in some embodiments, the gap 138 may be negligible.

In some embodiments, each of the plurality of top flaps 120 defines a top flap width $W_F$, wherein the top flap width $W_F$ extends between the second edge 120*b* and the fourth edge 120*d*. In some embodiments, the top flap width $W_F$ is between 3-8 in, between 4-7 in, or between 5-6 in. In some embodiments, the top flap width $W_F$ may be equal for the plurality of top flaps 120, while the top flap length $L_F$ may change across the plurality of top flaps 120 corresponding to the panel length $L_P$ of the corresponding panel of the plurality of panels 110.

Figure 2A:
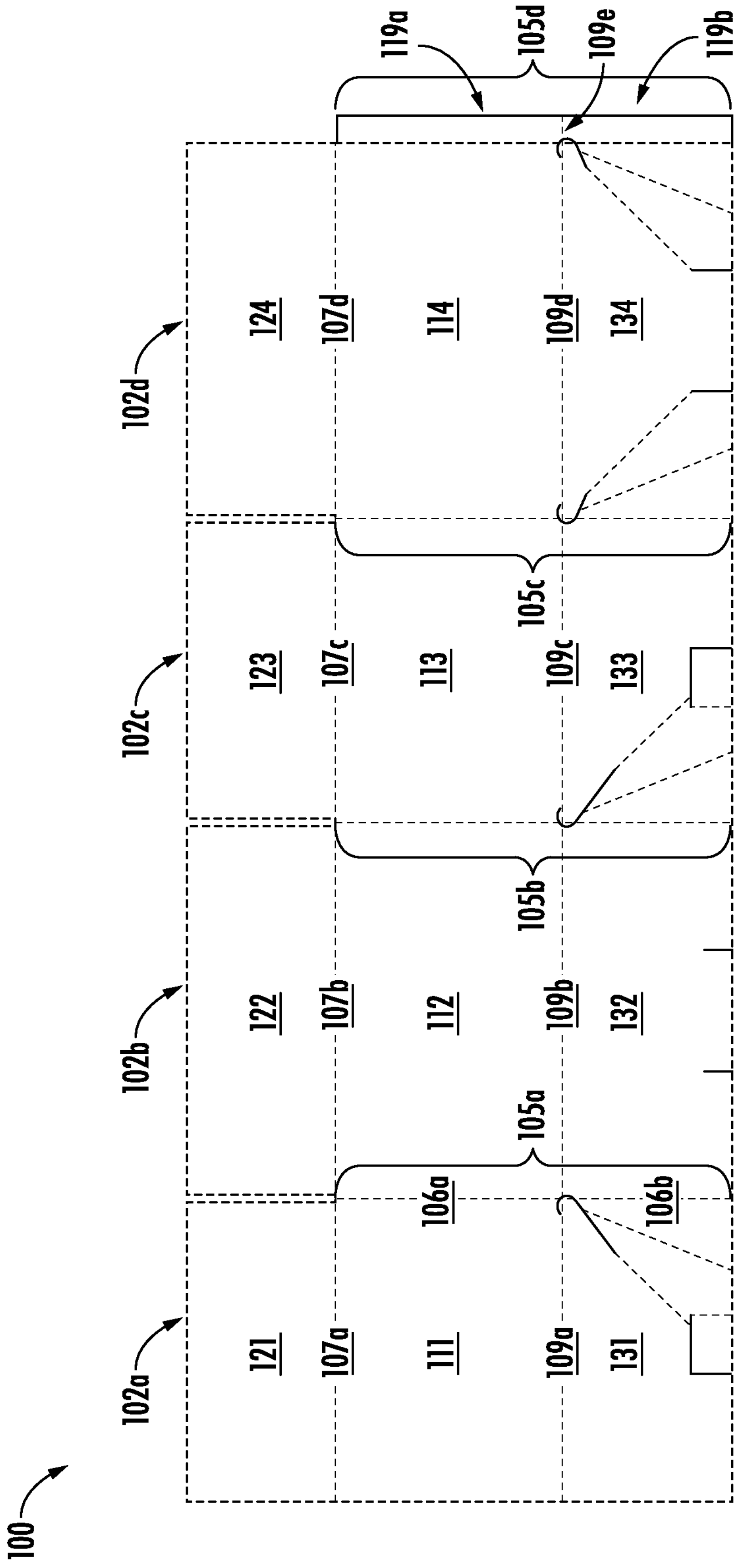
FIG. 2A illustrates an example box blank defining sections, in accordance with some embodiments discussed herein.

In some embodiments, such as illustrated in FIG. 2A, the box blank 100 may comprise a first section 102*a*, a second section 102*b*, a third section 102*c*, and a fourth section 102*d*, each comprising a panel, a top flap and a bottom flap. In some embodiments, the first section 102*a* may comprise a first panel 111 connected to a first bottom flap 131 along a first portion of the bottom flap score line 109*a*, and a first top flap 121 connected to the first panel 111 along a first portion of the flap score line 107*a*. The first top flap 121 being connected opposite the first bottom flap 131.

The second section 102*b* may comprise a second panel 112 connected to a second bottom flap 132 along a second portion of the bottom flap score line 109*b*, and a second top flap 122 connected to the second panel 112 along a second portion of the flap score line 107*b*. The second top flap 122 being connected opposite the second bottom flap 132. The second section 102*b* may be connected to the first section 102*a* along a first section score line 105*a* extending between at least the first panel 111 and the second panel 112, and between the first bottom flap 131 and the second bottom flap 132.

Similarly, the third section 102*c* may comprise a third panel 113 connected to a third bottom flap 133 along a third portion of the bottom flap score line 109*c*, and a third top flap 123 connected to the third panel 113 along a third portion of the flap score line 107*c*. The third top flap 123 being connected opposite the third bottom flap 133. The third section 102*c* may be connected to the second section 102*b* along a second section score line 105*b* extending between at least the second panel 112 and the third panel 113, and between the second bottom flap 132 and the third bottom flap 133.

Additionally, the fourth section 102*d* may comprise a fourth panel 114 connected to a fourth bottom flap 134 along a fourth portion of the bottom flap score line 109*d*, and a fourth top flap 124 connected to the fourth panel 114 along a fourth portion of the flap score line 107*d*. The fourth top flap 124 being connected opposite the fourth bottom flap 134. The fourth section 102*d* may be connected to the third section 102*c* along a third section score line 105*c* extending between at least the third panel 113 and the fourth panel 114, and between the third bottom flap 133 and the fourth bottom flap 134.

The flap 119 may comprise at least one of a flap panel 119*a* and/or a flap bottom 119*b* connected along a fifth portion of the bottom flap score line 109*e*. In some embodiments, the flap 119 may comprise only the flap panel 119*a*, while in other embodiments the flap 119 may comprise only the flap bottom 119*b*. In some embodiments, the flap 119 may comprise both the flap panel 119*a* and the flap bottom 119*b*. In some embodiments, the flap 119 may further comprise a flap top extending from the flap panel 119*a* opposite the flap bottom 119*b*. The flap 119 may be connected to the fourth section 102*d* along a fourth section score line 105*d* extending between at least the fourth panel 114 and the flap panel 119*a*. In some embodiments, the fourth section score line 105*d* may further extend between the fourth bottom flap 134 and the flap bottom 119*b*. Although illustrated as being attached to the fourth section 102*d*, the flap 119 may alternatively be attached to the first section 102*a*.

In some embodiments, the section score lines may include different kinds of scores along the length of the section score line 105. In this regard, each of the section score lines (e.g., 105*a*, 105*b*, 105*c*, 105*d*) may include a first portion 106*a* extending between the flap score line 107 and the panel score line 109, and a second portion 106*b* extending between the panel score line 109 and the fourth outer edge (e.g., 100*d* FIG. 1A). In some embodiments, the first portion 106*a* and the second section 106*b* may comprise different scores. For example, the first portion 106*a* may comprise and internal compression, wherein the internal structure of the blank along the first portion 106*a* may be crushed such that the blank is foldable along the first portion 106*a*. The second portion 106*b* may include perforations and through cuts extending through the thickness of the blank 100. The score through the section portion 106*b* may provide flexibility to the blank while maintaining connectivity of the bottom flaps 130, thereby imparting strength on the box upon formation from the blank 100.

The box blank 100 may comprise at least one web pattern score 140. The at least one web pattern score 140 may extend in at least one of the first bottom flap 131, the second bottom flap 132, the third bottom flap 133 or the fourth bottom flap 134. The web pattern score 140 may enable the plurality of bottom flaps 130 to fold into a bottom structure (e.g., 203 FIG. 4F) while maintaining continuity between each of the sections (e.g., 102 FIG. 1A). To explain, the score patterns in the at least one web pattern score 140 allow the plurality of bottom panels (e.g., 130 FIG. 2A) to fold and form into a bottom structure, while not creating any extended cuts, such that any of the plurality of bottom flaps (e.g., 130 FIG. 1A) may move independently of one another. In this regard, the plurality of bottom flaps 130 may be continuous along the box blank 100 even across the first section score line 105*a*, the second section score line 105*b*, the third section score line 105*c*, and the fourth section score line 105*d*.

Figure 2B:
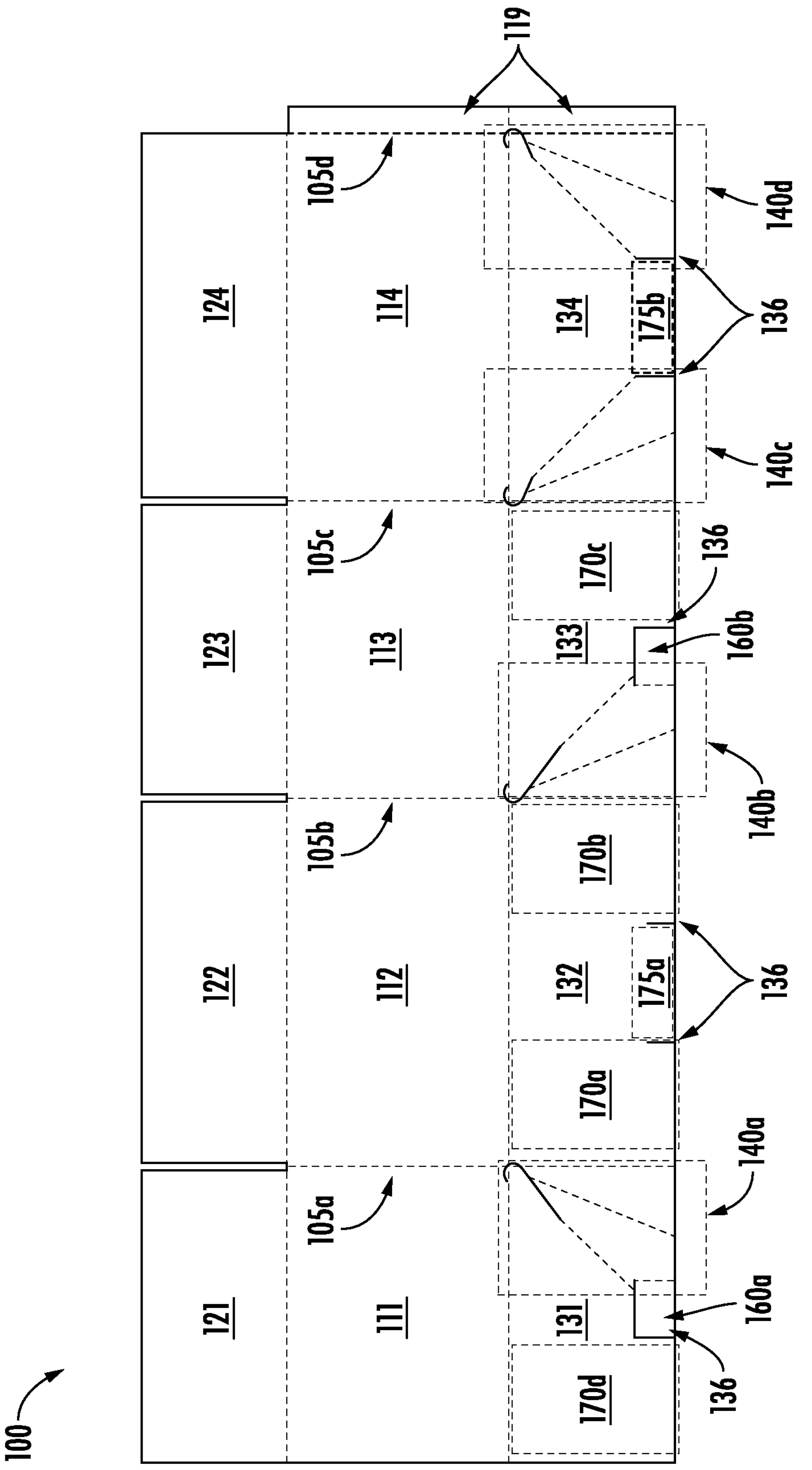
FIG. 2B illustrates features of the example box blank shown in FIG. 2A, in accordance with some embodiments discussed herein.

In some embodiments, such as illustrated in FIG. 2B, the box blank 100 may comprise multiple web pattern scores. In some embodiments, a first web pattern score 140*a* may extend within the first bottom flap 131, a second web pattern score 140*b* may extend within the third bottom flap 133, a third web pattern score 140*c* and a fourth web pattern score 140*d* may extend within the fourth bottom panel 134. Each of the web pattern scores 140 may correspond to a receiving face 170 on an opposite side of the corresponding section score line 105. In this regard, the first web pattern score 140*a* may correspond to a first receiving face 170*a* on an opposite side of the first section score line 105*a*. Thus, the first receiving face 170*a* may be within the second bottom flap 132. Similarly, the second web pattern score 140*b* may correspond to a second receiving face 170*b* on an opposite side of the second section score line 105*b*. Thus, the second receiving face 170*b* may also extend within the second bottom flap 132. The third web pattern score 140*c* may correspond to a third receiving face 170*c* on an opposite side of the third section score line 105*c*. Thus, the third receiving face may extend within the third bottom flap 133. Finally, the fourth web pattern score 140*d* may correspond to a fourth receiving face 170*d*. The fourth receiving face 170*d* may extend within the first bottom flap 131. In this regard, when the box blank 100 is formed into a box, the fourth section will be adjacent the first section, via the connection between the flap 119 and the first section 102*a*, thus the fourth web pattern score 140*d* and the fourth receiving face 170*d* may be on opposite sides of the fourth section score 105*d* when the box blank 100 is erected into a box (see e.g., 200 FIG. 4F).

In some embodiments, one or more of the plurality of bottom flaps 130 may comprise at least one cut 136 extending within the bottom flap, wherein the at least one cut 136 defines a feature within the bottom flap 130. For example, in some embodiments, the first bottom flap 131 may comprise the at least one cut 136 defining a first tab 160*a*. The at least one cut 136 may define an "L" shape wherein the at least one cut comprises two cuts at a 90 degree angle. The first tab 160*a* may be foldable along a score line or foldable section. Although described herein as an "L" it should be understood that the at least one cut 136 may be any configuration which may define a tab, for example, curved, defining a smaller angle, defining a larger angle, or even a single cut at an angle. In some embodiments, the first tab 160*a* may be connected on one side to the first bottom flap 131. In some embodiments, the first tab 160*a* may be removed completely from the first bottom flap 131. Similarly, the third bottom flap 133 may comprise a cut 136 defining a second tab 160*b*. In some embodiments, the second tab 160*b* may be the same as the first tab 160*a*. In this regard, the second tab 160*b* may be defined by the cut 136 such that the second tab 160*b* is connected to the third bottom flap 133 on a single side. In some embodiments, the first tab 160*a* may be a mirror imaged opposite to the second tab 160*b* so as to, together, form a tab portion of the bottom structure when the box is erected.

In some embodiments, the second bottom flap 132 may comprise multiple cuts 136 defining a receiving tab 175*a*. In some embodiments, the receiving tab 175*a* may comprise a first cut 136 on one side and a second cut 136 on a second side. In some embodiments, the first cut 136 and the second cut 136 may be spaced apart from the section score line 105. In some embodiments, the first cut 136 and the second cut 136 may be parallel to the section score line 105, while in other embodiments the first cut 136 and the second cut 136 may extend towards, but not intersect the section score line 105. In this regard, the receiving tab 175*a* may flex within the plane of the box blank 100 such that a securing tab 175*b* formed in the fourth bottom flap 134 may be nested under the receiving tab 175*a* when the box blank is formed into a box. In this regard, the fourth bottom flap 134 may comprise a first cut 136 and a second cut 136 on either side of the securing tab 175*b*. In some embodiments, the securing tab 175*b* is configured to engage with the receiving tab 175*a* to secure the bottom of the box when the box blank 100 is erected into a box 200. In some embodiments, the first and second cuts 136 in the fourth bottom flap 134 encourage and aid in folding of the web pattern score 140, such that the securing tab 175*b* may be positioned under the receiving tab 175*a*.

In some embodiments, the first cut 136 and the second cut 136 defining the receiving tab 175*a* may be shorter than the first cut 136 and the second cut 136 defining the securing tab 175*b*. In this regard, the receiving tab 175*a* may be a guide for the securing tab 175*b*. However, once the securing tab 175*b* is engaged with the receiving tab 175*a* the shorter cuts 136 of the receiving tab 175*a* prevent the securing tab 175*b* from disengaging without an application of force.

As discussed herein, the at least one web pattern score 140 is configured to aid in the folding of the plurality of bottom flaps 130 into the bottom of the formed box. FIGS. 3A-F illustrate various configurations of the at least one web pattern score 140. In some embodiments, the at least one web pattern score 140 extends within one of the plurality of bottom flaps 130 (e.g., the first bottom flap 131, the second bottom flap 132, the third bottom flap 133, or the fourth bottom flap 134 as shown in FIG. 2A).

In some embodiments, the at least one web pattern score 140 comprises a first score line 141 and a second score line 142. The first score line 141 may extend away from (although it may not be directly connected to) the corresponding section score line 105 (e.g., the first section score line 105*a*, the second section score line 105*b*, the third section score line 105*c*, or the fourth section score line 104*d* FIG. 2B), illustrated in FIGS. 3A, and 3D-F, or an intersection 155 of the panel score line 109 and the corresponding section score line 105 (e.g., the first section score line 105*a*, the second section score line 105*b*, the third section score line 105*c*, or the fourth section score line 104*d* FIG. 2B), illustrated in FIGS. 3B-C.

Figure 3A:
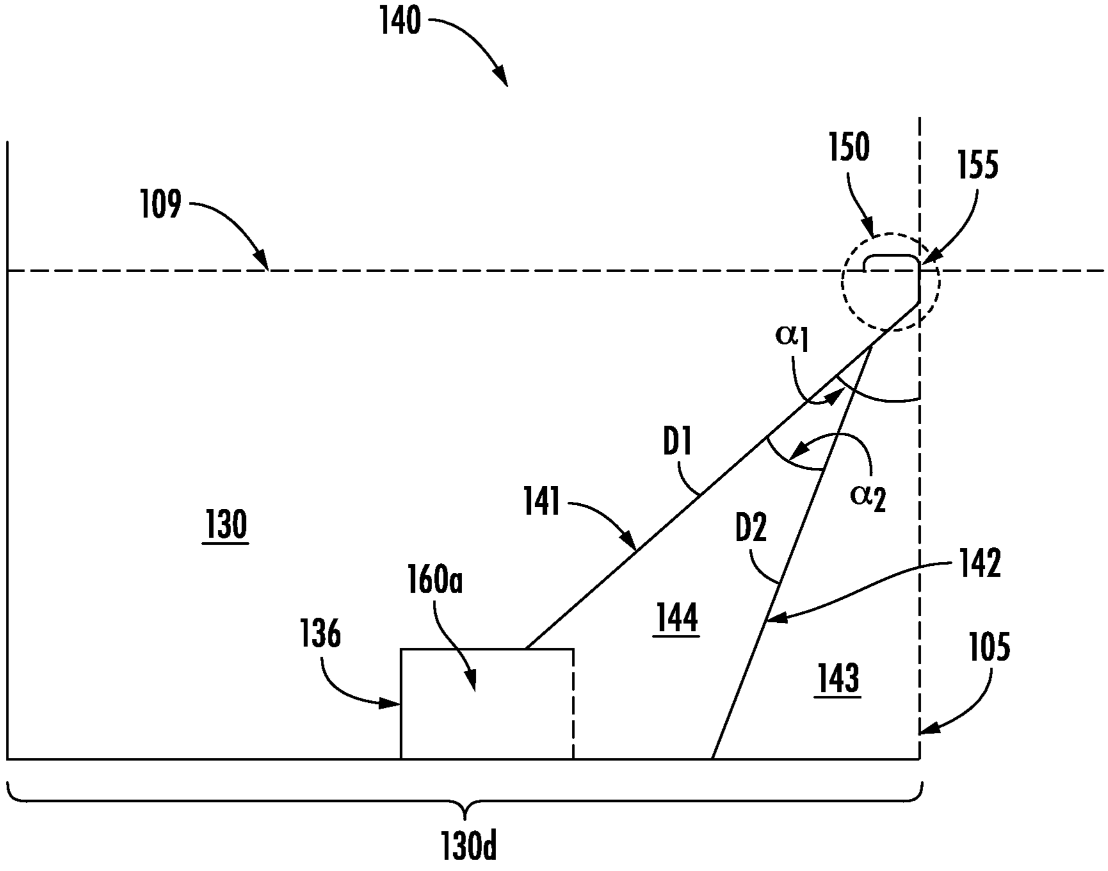
Figure 3B:
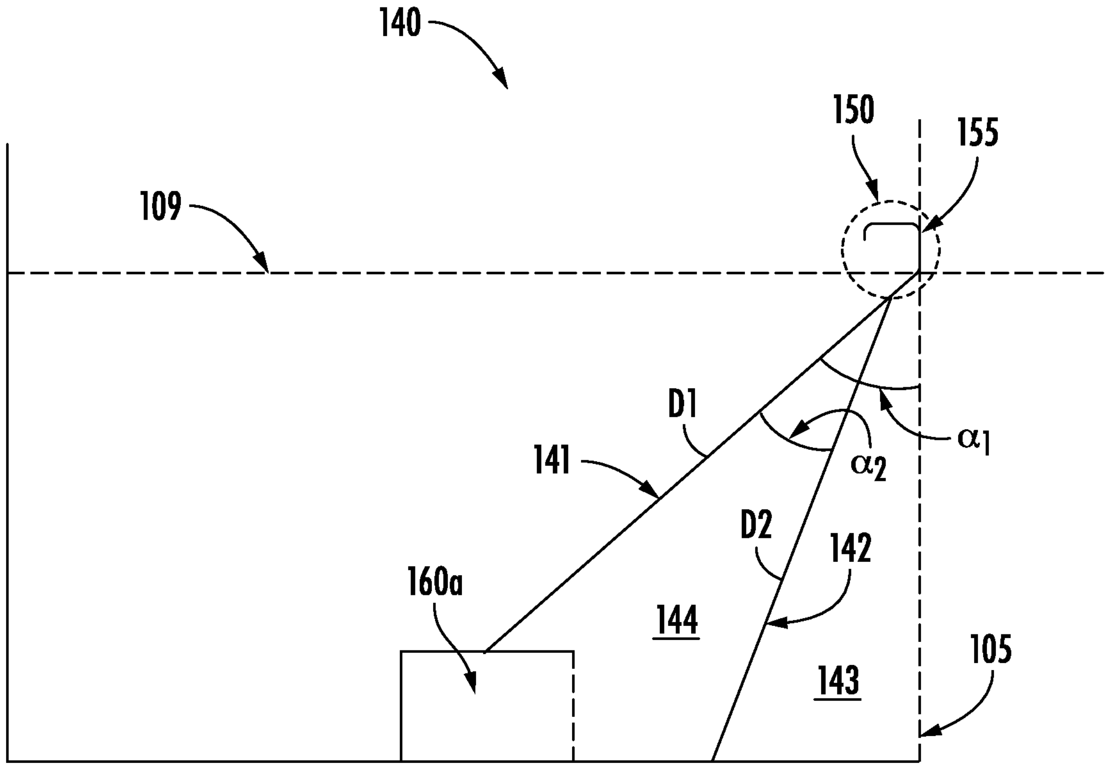
Figure 3C:
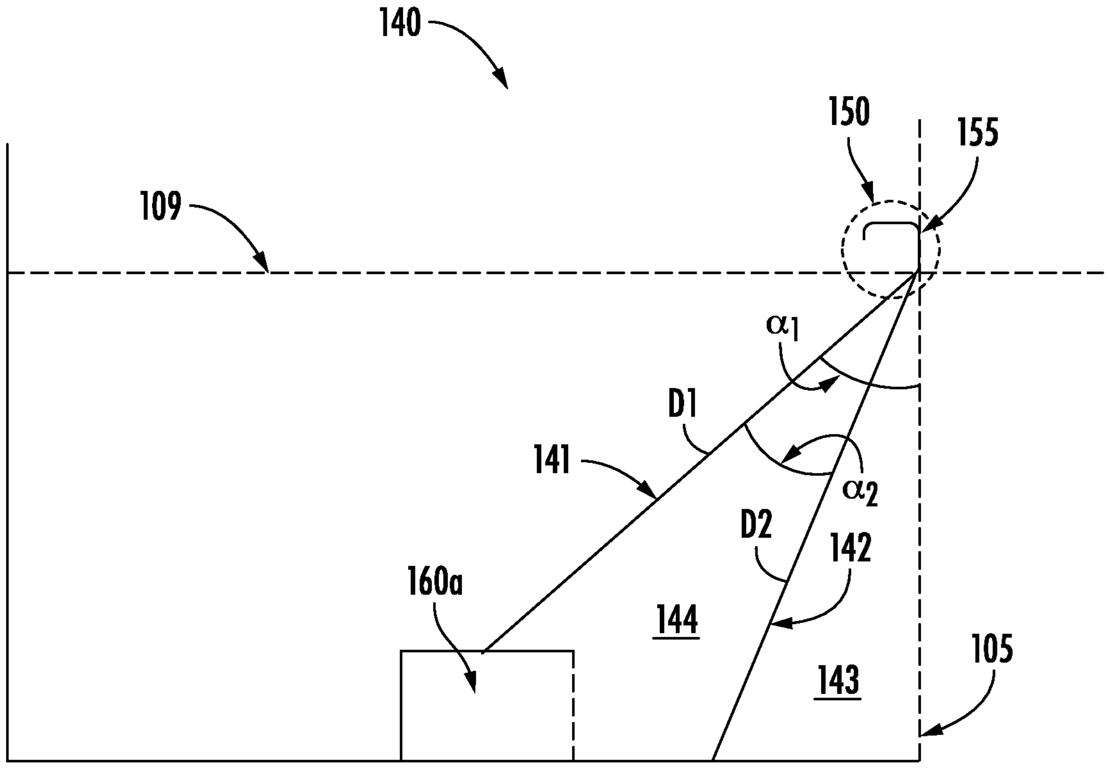
Figure 3D:
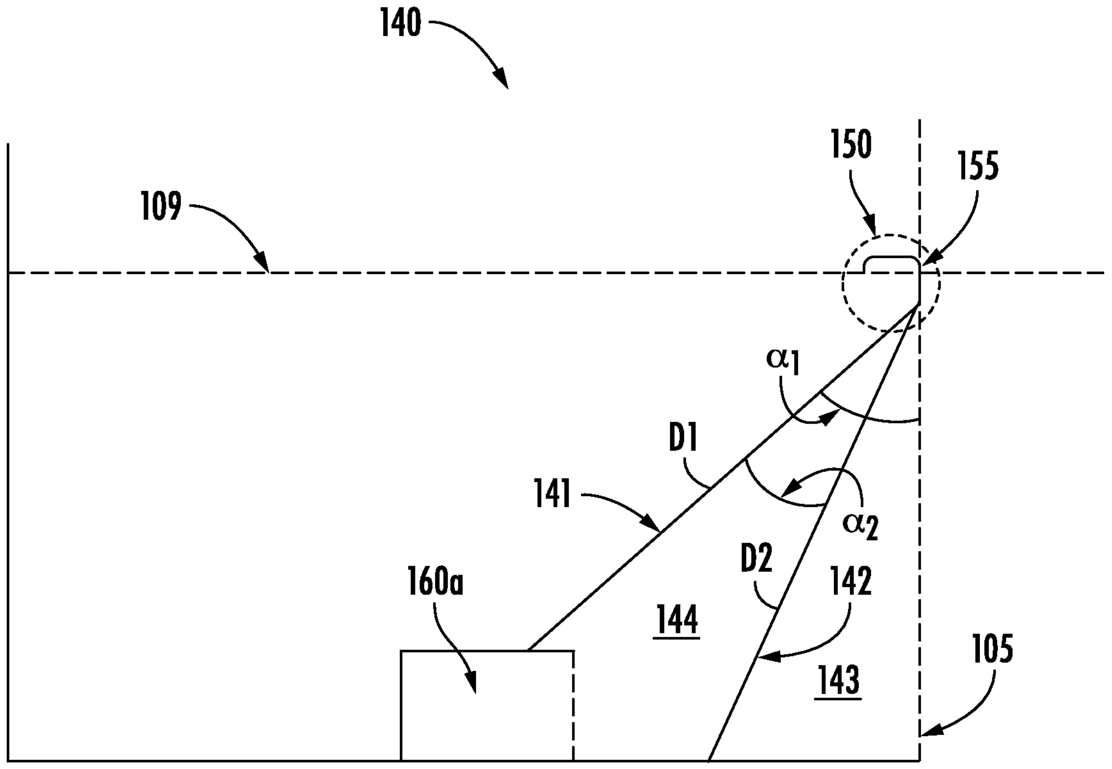
Figure 3E:
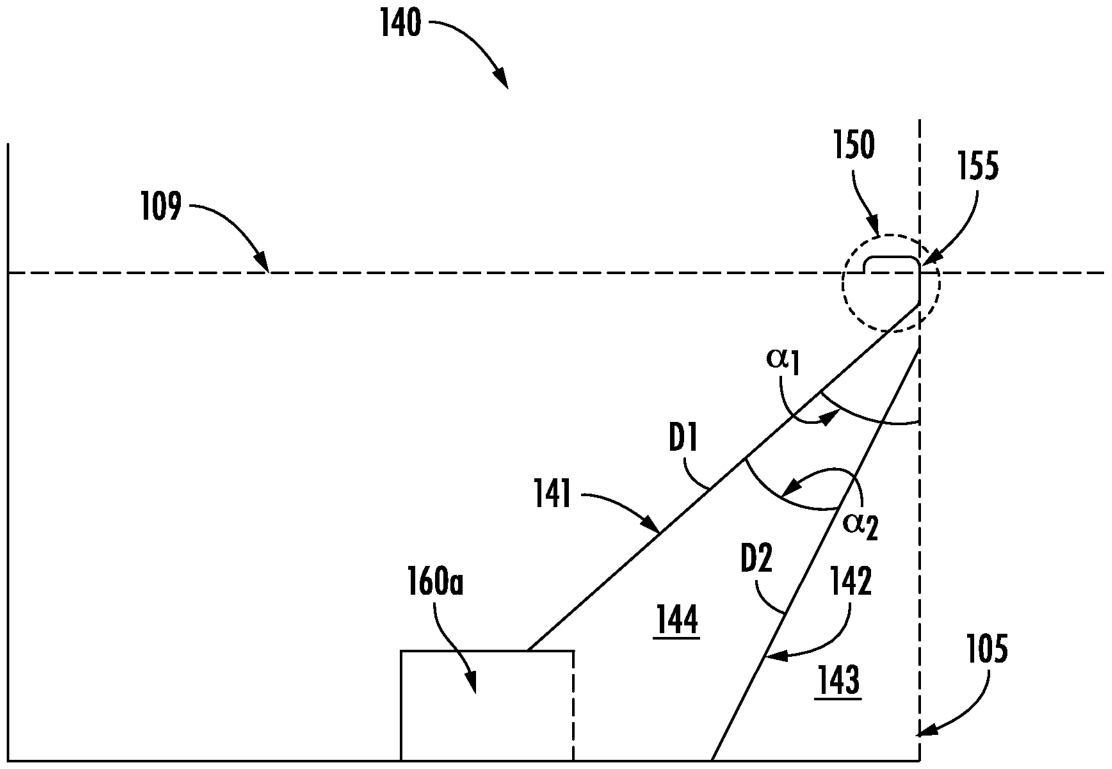
Figure 3F:
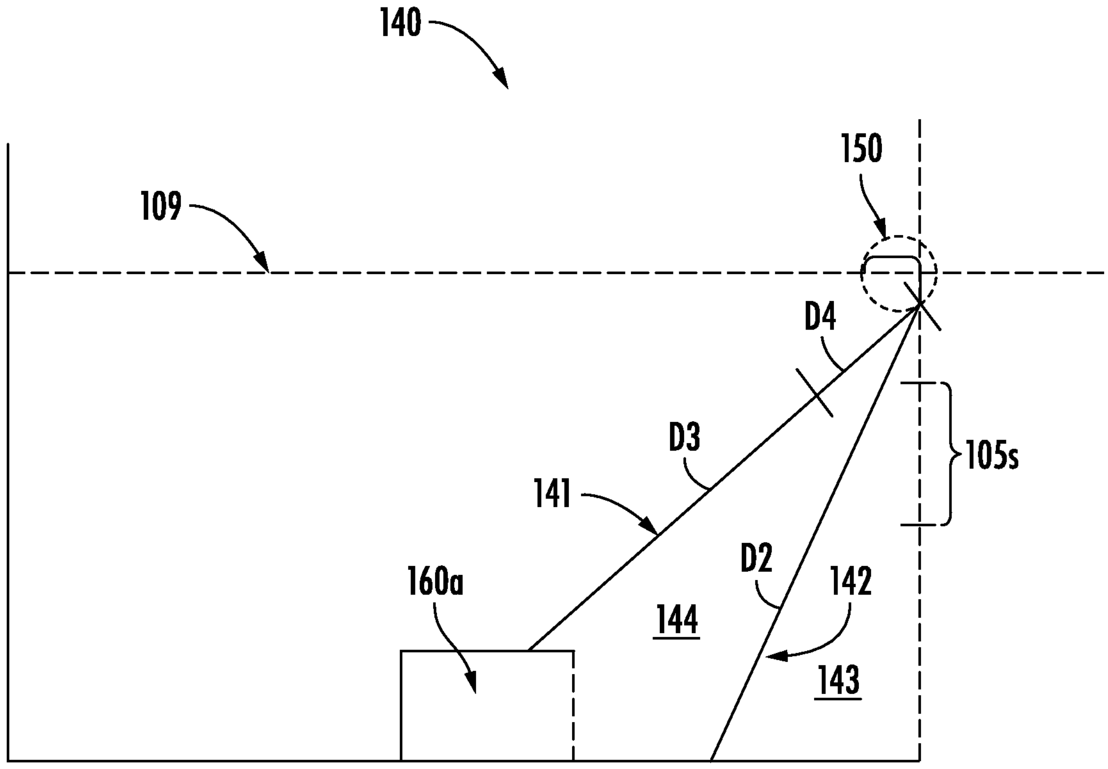

The second score line 142 may extend from one of: the first score line 141, illustrated in FIGS. 3A-B and 3F, the intersection of the panel score line 109 and the respective section score line (e.g., the first section score line 105*a*, the second section score line 105*b*, the third section score line 105*c*, or the fourth section score line 104*d* FIG. 2B), illustrated in FIG. 3C, or from the section score line (e.g., the first section score line 105*a*, the second section score line 105*b*, the third section score line 105*c*, or the fourth section score line 104*d* FIG. 2B), illustrated in FIGS. 3D-F. In some embodiments, the second score line 142 may contact the first score line 141, for example, as shown in FIGS. 3A-D, while in other embodiments the second score line 142 may be distinct from the first score line, as illustrated in FIG. 3E. In this regard, the term extend away from may indicate that the score line extends all the way to the point or extends generally from the area around the point.

In some embodiments, the first score line 141 extends a first distance $D_1$ within one of the plurality of bottom flaps 130 (e.g., the first bottom flap 131, the second bottom flap 132, the third bottom flap 133, or the fourth bottom flap 134 FIG. 2A).

The first score line 141 may extend at a first angle $\alpha_1$ in relation to the section score line 105. In some embodiments, the first angle $\alpha_1$ may be up to 60 degrees, up to 50 degrees, or up to 40 degrees. In some embodiments, the first angle $\alpha_1$ may be 45 degrees. In some embodiments, the first score line 141 may extend to one of the cuts 136 defining one of the first tab 160*a*, illustrated, the second tab (e.g., 160*b* FIG. 2B), the receiving tab (e.g., 175*a* FIG. 2B) or the securing tab (e.g., 175*b* FIG. 2B). In this regard, extending the first score line 141 to the cut 136 provides the web pattern score 140 with flexibility within the respective bottom flap 130. The flexibility allows the web pattern score 140 to deform to fold into the bottom of the box, and reform into a planar pattern.

The second score line 142 may aide in the flexibility of the web pattern score 140 such that the web pattern score 140 may deform and reform into the planar pattern upon formation of the box. Thus, in some embodiments, the second score line 142 may extend a second distance $D_2$ within the corresponding bottom flap 130. In some embodiments, the first distance $D_1$ of the first score line 141 may be greater than the second distance $D_2$ of the second score line 142.

The second score line 142 may extend at second angle $\alpha_2$ in relation to the first score line 141. In this regard, the second angle $\alpha_2$ is less than the first angle $\alpha_1$. In some embodiments, the second angle $\alpha_2$ may be less than 40 degrees, less than 30 degrees, or even less than 20 degrees. In some embodiments, the second angle $\alpha_2$ may be between 10-40 degrees, between 10-30 degrees, or even between 15-25 degrees. In some embodiments, the second angle $\alpha_2$ may be 22.5 degrees.

The first score line 141 and the second score line 142 may define subsections within the web pattern score 140. In some embodiments, a first subsection 143 may be defined between the section score line 105 (e.g., the first section score line 105*a*, the second section score line 105*b*, the third section score line 105*c*, or the fourth section score line 104*d* FIG. 2B) and the second score line 142. In some embodiments, a second subsection 144 may be defined between the first score line 141 and the second score line 142.

In some embodiments, the first score line 141 and the second score line 142 may be an internal score, wherein the interior side of the blank is compressed. In some embodiments, the first score line 141 and the second score line 142 may comprise a series of perforations configured to impart flexibility on the bottom flap 130 while maintaining connectivity of the bottom flaps 130 as a continuous web.

In some embodiments, the web pattern score 140 may comprise a hook 150. In some embodiments, the hook 150 may extend within the respective bottom flap 130, while in other embodiments the hook 150 may extend to the adjacent bottom flap (e.g., across the section score line 105) or into the adjacent panel (e.g., across the panel score line 109). In some embodiments, the hook 150 may be a through cut. The hook feature may aid in flexibility of the bottom flap and web pattern score, such as during deforming of the web pattern score, while limiting the size of cut needed. In some embodiments, the through cut may extend into the first score line 141. Thus, as illustrated in FIG. 3F, a first distance $D_4$ of the first score line 141 may be a through cut, while a second portion $D_3$ of the first score line 141 may include perforations thereby providing flexibility to fold the first subsection 143 and the second subsection 144 to form the bottom of the box.

Although described with a first score line 141 and a second score line 142, in other embodiments a third or more score line(s) may be added between either the first score line 141 and the second score line 142, or between the second score line 142 and the section score line 105.

Example Process

FIGS. 4A-F illustrate example formation of the bottom structure of an example box 200 formed from an example blank (e.g., 100 FIG. 1A). In some embodiments, the flap 219 may be attached to the first section (e.g., 102*a* FIG. 2A) thereby forming a first wall (e.g., 211) and a first bottom flap 231. In some embodiments, the flap 219 may be connected using a glue, an epoxy, an adhesive or similar to secure the blank into a four walled structure 201 as illustrated in FIG. 4A.

The four walled structure 201 may include the first wall, and first bottom flap, a second wall 212 and second bottom flap 232, a third wall 213 and a third bottom flap 233, and a fourth wall (e.g., 214 FIG. 4C) and a fourth bottom flap 234. In some embodiments, each of the walls and bottom flaps are connected along a panel score line 209 that is foldable.

In some embodiments, the bottom flaps are foldable along the panel score line to form the bottom of the box. In some embodiments, a first tab 260*a* and a second tab 260*b* are formed within the first bottom flap 231 and the third bottom flap 233 respectively, while in other embodiments a cut in each of the first bottom flap 231 and the third bottom flap 233 may be sufficient.

In regards to the present example, the first tab 260*a* and the second tab 260*b* are folded out of the plane of the first bottom flap 231 and the third bottom flap 233 respectively. The movement of the first tab 260*a* and the second tab 260*b* provides space and flexibility in the first bottom flap 231 and the third bottom flap 233 to allow the second bottom flap 232 to fold towards the interior of the four walled structure 201, illustrated by arrow 290.

FIG. 4B illustrates an intermediate position of the four walled structure 201 as the second bottom flap 232 is transitioned to form the bottom of the box. The four walled structure 201 comprises at least one web pattern score 240, comprising a first score line 241*b* and a second score line 242*b*. The at least one web pattern score 240 defines a first subsection 243 extending between the second score line 242*b* and the section score line 205, and a second subsection 244 extending between the first score line 241*b* and the second score line 242*b*.

As the second bottom flap 232 is transitioned, the third bottom flap 233, (and the first bottom flap 231) fold along the first score line 241, the second score line 242, and the section score line 205. In the intermediate position, in some embodiments, such as illustrated in FIG. 4B, the first sub-section 243 and the second subsection 244 are folded together to pass through face-to-face (or near face-to-face) contact on the exterior face, while in other embodiments, for example, shown in FIG. 4D, the first subsection 243 and the second subsection 244 are folded together to pass through face-to-face (or near face-to-face) contact on the interior face.

After the second bottom flap 232 is transitioned towards the interior of the four walled structure 201, as illustrated in FIG. 4C, the first bottom flap 231 and the second bottom flap 233 may be folded towards the middle along the panel score line (e.g., 209 FIG. 4A). A first web pattern score 240*a* formed in the first bottom flap 231, and a second web pattern score 240*b* formed in the third bottom flap 233 aid the second bottom flap 232 folding. After the second bottom flap 232 is folded, the first bottom flap 231 and the third bottom flap 233 are folded towards the middle of the four walled structure 201. The first web pattern score 240*a* is folded onto a first receiving face 270*a* and the second web pattern score 240*b* is folded onto a second receiving face 270*b* each within the second bottom flap 232.

The third web pattern score 240*c* formed within the fourth bottom panel 234 may deform as described in relation to the at least one web pattern score 240 above to fold the third bottom flap 233 to the center of the four walled structure 201. Similarly, the fourth web pattern score 240*d* formed within the fourth bottom flap 234 deforms to fold the first bottom flap 231 to the center of the four walled structure 201.

As discussed above, FIG. 4D illustrates configuration of the at least one web pattern score 240*c* folding. In the illustrated example, the first score line 241*c*, the second score line 242*c*, and the section score line 205*c* are folded to deform the at least one web pattern score 240. In the illustrated example, the first subsection 243 and the second subsection 244 are folded together so the internal portion passes through face-to-face (or near face-to-face) contact.

FIG. 4D further illustrates a hook 250 defining a through cut extending from the first score line 241. The hook 250 is formed such that the first score line 241*c* does not continue into the walls of the four walled structure 201. This may impart strength onto the bottom of the box as the positioning of the hook 250 may distribute weight positioned in the box across each of the hooks (e.g., corresponding to each of the first web pattern score, second web pattern score, third web pattern score, and fourth web pattern score).

Folding each of the third web pattern score 240*c* and the fourth web pattern score 240*d* to allow the first bottom flap 231 and the third bottom flap 233 to be received by the first receiving face 270*a* and the second receiving face 270*b* exposes the securing tab 275*b*.

FIG. 4E illustrates the four walled structure before the fourth bottom flap 234 is folded towards the center of the four walled structure 201. In this regard, the third web pattern score 240*c* is positioned flush with a third receiving face 270*c* of the first bottom flap 231, and the fourth web pattern score 240*d* is positioned flush with the fourth receiving face 270*d* in the third bottom flap 233.

The securing tab 275*b* is configured to go under the receiving tab 275*a* to secure the box bottom together illustrated in FIG. 4F. Thus, a bottom structure 203 comprises the first bottom flap 231, the second bottom flap 232, the third bottom flap 233 and the fourth bottom flap 234 all as a continuous web. In the bottom structure 203 profile, each of the bottom flaps are distinguished by the respective first score line (e.g., 241*a*, 241*b*, 241*c*, 241*d*).

As mentioned above, the hooks 250 extending from each of the first score lines 241*a*, 241*b*, 241*c*, 241*d* are oriented in different directions. The difference in the directions of the hooks 250 provides a positive lock in the bottom structure 203 and improves the strength of the bottom structure. In this regard, the hooks 250 allow for the weight to be distributed along the bottom structure 203 and into the walls when products are placed in the box. In some embodiments, the bottom structure 203 may have an improved strength of over 20% when compared to bottom structures comprising cut outs between each flap (e.g., a discontinuous web). In this regard, in addition to improving the strength of the bottom structure of the box, the die cutting press may produce the box blanks at a greater efficiency by reducing downtime and increasing through put, since there is no scrap material generated by the die cutting press.

Example Flowchart(s)

Various examples of the operations performed in accordance with some embodiments of the present invention will now be provided with reference to FIG. 5. In this regard, FIG. 5 illustrates a flowchart according to an example method for forming a box from a box blank according to an example embodiment 300. The operations illustrated in and described with respect to FIG. 5 may, for example, be performed by, with the assistance of, and/or under the control of one or more of a user or a machine for performing the operation (e.g., a corrugator for forming the corrugated box blanks, a die cut for scoring and cutting the corrugated box blanks, a box maker for forming the box or portions thereof, etc.).

Operation 310 may comprise providing a web blank, and operation 320 may comprise running the web blank through a die cutting press to form the box blank with appropriate scores and cuts, such as described herein.

Operation 330 may comprise providing the box blank to a box maker to assemble at least a portion of the box (although box formation may, in some embodiments, occur manually). For example, the box maker may form the box blank into a four walled structure (e.g., connected the flap to a corresponding panel). The resulting four walled structure may then be shipped (e.g., in pallet form or otherwise) to a customer for later box formation and packing.

Then, such as upon arrival at the final destination, operation 340 may comprise erecting the box, such as by forming the bottom structure as described herein. Such a procedure, for example, can be performed manually. Then, at operation 350, the box may be filled with items, and operation 360 may optionally comprise folding and securing the flaps to secure the box in a closed position. This may be performed using a machine/device and/or via a user.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A box blank for a box, the box blank comprising:

a first section comprising at least a first panel and a first bottom flap connected along a first portion of a panel score line;

a second section comprising at least a second panel and a second bottom flap connected along a second portion of the panel score line, wherein the first section and the second section are connected along a first section score line;

a third section comprising at least a third panel and a third bottom flap connected along a third portion of the panel sore line, wherein the second section and the third section are connected along a second section score line;

a fourth section comprising at least a fourth panel and a fourth bottom flap connected along a fourth portion of the panel score line, wherein the third section and the fourth section are connected along a third section score line;

a connecting flap comprising at least one of a connecting flap panel or a connecting flap bottom connected along a flap portion of the panel score line, wherein the flap is connected to either the first section or the fourth section along a fourth section score line;

wherein each of the panel score line, the first section score line, the second section score line, the third section score line and the fourth section score line are foldable;

wherein the panel score line intersects each of the first section score line, the second section score line, the third section score line, and the fourth section score line; and at least one web pattern score extending in one of the first bottom flap, the second bottom flap, the third bottom flap, or the fourth bottom flap, wherein the web pattern score comprises:

a first score line extending a first distance along the one of the first bottom flap, the second bottom flap, the third bottom flap, or the fourth bottom flap, wherein the first score line extends at a first angle away from either one of the first section score line, the second section score line, the third section score line, or the fourth section score line or an intersection of the panel score line and one of the first section score line, second section score line, third section score line or the fourth section score line; and a second score line extending a second distance along one of the first bottom flap, the second bottom flap, the third bottom flap, or the fourth bottom flap, wherein the second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line, wherein the second angle is less than the first angle such that the first score line and the second score line form a web-like pattern that includes a first subsection between the second score line and one of the first section score line, the second section score line, the third section score line, or the fourth section score line and a second subsection between the first score line and the second score line, wherein the web pattern score enables folding such that the first subsection folds towards the second subsection when the box blank is being formed into the box;

wherein the first bottom flap and the second bottom flap are connected along the first section score line, the second bottom flap and the third bottom flap are connected along the second section score line, and the third bottom flap and the fourth bottom flap are connected along the third section score line, thereby forming a continuous bottom web.

2. The box blank of claim 1, wherein the at least one web pattern score is at least a first web pattern score and a second web pattern score, wherein the first web pattern score extends within the first bottom flap, and the second web pattern score extends within the third bottom flap.

3. The box blank of claim 2, wherein the at least one web pattern score further comprises a third web pattern score, wherein the third web pattern score extends within the fourth bottom flap.

4. The box blank of claim 3, wherein the first score line of the first web pattern score extends from one of either the intersection of the panel score line and the first section score line or the first section score line;

wherein a first score line of the second web pattern score extends from one of either the intersection of the panel score line and the second section score line or the second section score line; and wherein a first score line of the third web pattern score extends from one of either the intersection of the panel score line and the third section score line or the third section score line.

5. The box blank of claim 4, wherein the at least one web pattern score further comprises a fourth web pattern score, wherein the fourth web pattern score extends within the fourth bottom flap; and wherein a first score line of the fourth web pattern score extends from one of either the intersection of the panel score line and the fourth section score line or the fourth section score line.

6. The box blank of claim 1, further comprising at least one adjacent face, wherein the at least one adjacent face is on an opposing side of either the first section score line, the second section score line, the third section score line, or the fourth section score line than the at least one web pattern score.

7. The box blank of claim 6, wherein the first subsection and the second subsection are in face-to-face contact with the at least one adjacent face when the box blank is formed into a box.

8. The box blank of claim 1, wherein the web pattern score further comprises a hook defined by a through cut extending from the first score line and extending at least partially within the at least one bottom flap.

9. The box blank of claim 8, wherein the hook extends over at least one of the first section score line, the second section score line, the third section score line, the fourth section score line, the panel score line, or the intersection of the panel score line and one of the first section score line, the second section score line, the third section score line, or the fourth section score line.

10. The box blank of claim 1, wherein the at least one second score line extends to an outer edge of the one of the first bottom flap, the second bottom flap, the third bottom flap, or the fourth bottom flap.

11. The box blank of claim 1 further comprising:

a tab defined by at least one cut extending partially within the one of the first bottom flap, the second bottom flap, the third bottom flap or the fourth bottom flap, wherein the first score line extends to the at least one cut defining the tab.

12. The box blank of claim 1, wherein the first section further comprises a first tab defined by at least one cut extending at least partially from an outer edge of the first bottom flap into the first bottom flap;

wherein the second section further comprises a receiving tab defined by at least one cut extending at least partially from an outer edge of the second bottom flap into the second bottom flap;

wherein the third section further comprises a second tab defined by at least one cut extending at least partially from an outer edge of the third bottom flap into the third bottom flap; and wherein the fourth section further comprises a securing tab defined by at least one cut extending at least partially from an outer edge of the fourth bottom flap into the fourth bottom flap.

13. The box blank of claim 1, wherein the first section further comprises a first top flap connected to the first panel along a first section of a top flap score line, wherein the second section further comprises a second top flap connected to the second panel along a second section of the top flap score line, wherein the third section further comprises a third top flap connected to the third panel along a third section of the top flap score line, wherein the fourth section further comprises a fourth top flap connected to the fourth panel along a fourth section of the top flap score line, and wherein the top flap score line is foldable.

14. The box blank of claim 1, wherein the first subsection and the second subsection of the at least one web pattern score come into or proximate to face-to-face contact when the box blank is being formed into a box.

15. The box blank of claim 1, wherein the first distance is greater than the second distance.

16. The box blank of claim 1, wherein the section score line comprises a perforated portion and a through cut portion.

17. The box blank of claim 1, wherein the first score line comprises a first portion and a second portion, wherein the first portion comprises perforations, and the second portion comprises a through cut.

18. A method of forming a box, the method comprising:

providing a blank, the blank comprising:

a first section comprising at least a first panel and a first bottom flap connected along a first portion of a panel score line;

a second section comprising at least a second panel and a second bottom flap connected along a second portion of the panel score line, wherein the first section and the second section are connected along a first section score line;

a third section comprising at least a third panel and a third bottom flap connected along a third portion of the panel sore line, wherein the second section and the third section are connected along a second section score line;

a fourth section comprising at least a fourth panel and a fourth bottom flap connected along a fourth portion of the panel score line, wherein the third section and the fourth section are connected along a third section score line;

a connecting flap comprising at least one of a connecting flap panel or a connecting flap bottom connected along a flap portion of the panel score line, wherein the flap is connected to either the first section or the fourth section along a fourth section score line;

wherein each of the panel score line, the first section score line, the second section score line, the third section score line and the fourth section score line are foldable;

wherein the panel score line intersects each of the first section score line, the second section score line, the third section score line, and the fourth section score line; and at least one web pattern score extending in one of the first bottom flap, the second bottom flap, the third bottom flap, or the fourth bottom flap, wherein the web pattern score comprises:

a first score line extending a first distance along the one of the first bottom flap, the second bottom flap, the third bottom flap, or the fourth bottom flap, wherein the first score line extends at a first angle away from either one of the first section score line, the second section score line, the third section score line, or the fourth section score line or an intersection of the panel score line and one of the first section score line, second section score line, third section score line or the fourth section score line; and a second score line extending a second distance along one of the first bottom flap, the second bottom flap, the third bottom flap, or the fourth bottom flap, wherein the second score line extends at a second angle away from either: the first score line; one of the first section score line, the second section score line, the third section score line or the fourth sections score line; or the intersection of the panel score line and one of the first section score line, the second section score line, the third section score line, or the fourth section score line, wherein the second angle is less than the first angle such that the first score line and the second score line form a web-like pattern that includes a first subsection between the second score line and one of the first section score line, the second section score line, the third section score line, or the fourth section score line and a second subsection between the first score line and the second score line, where in the web pattern score enables folding such that the first subsection lies adjacent and flush with the second subsection when the box blank is formed into the box; and adhering the flap to the first section to form a four walled structure;

wherein the first bottom flap and the second bottom flap are connected along the first section score line, the second bottom flap and the third bottom flap are connected along the second section score line, and the third bottom flap and the fourth bottom flap are connected along the third section score line, thereby forming a continuous bottom web.

19. The method of claim 18, further comprising:

folding the second bottom flap towards a center of the four walled structure;

folding the first bottom flap towards the center of the for walled structure such that a portion of the first bottom flap is in face-to-face contact with the second bottom flap;

folding the third bottom flap towards the center of the four walled structure, such that a portion of the third bottom flap is in face-to-face contact with the second bottom flap;

folding the fourth bottom flap towards the center of the four walled structure, such that a first portion of the fourth bottom flap is in face-to-face contact with the first bottom flap, and a second portion of the fourth bottom flap is in face-to-face contact with the third bottom flap; and tucking a tab portion of the fourth bottom flap below a receiving portion of the second bottom flap.

20. A box formed from a box blank, the box comprising:

a first section comprising at least a first wall and a first bottom flap connected along a first portion of a panel score line;

a second section comprising at least a second wall and a second bottom flap connected along a second portion of the panel score line, wherein the first section and the second section are connected along a first section score line;

a third section comprising at least a third wall and a third bottom flap connected along a third portion of the panel sore line, wherein the second section and the third section are connected along a second section score line;

a fourth section comprising at least a fourth wall and a fourth bottom flap connected along a fourth portion of the panel score line, wherein the third section and the fourth section are connected along a third section score line;

at least one of a connecting flap wall or a connecting flap bottom connected along a flap portion of the panel score line, wherein the flap is connected to either the first section or the fourth section along a fourth section score line;

wherein each of the panel score line, the first section score line, the second section score line, the third section score line, and the fourth section score line are foldable;

wherein the panel score line intersects each of the first section score line, the second section score line, the third section score line, and the fourth section score line; and at least one web pattern score extending in one of the first bottom flap, the second bottom flap, the third bottom flap, or the fourth bottom flap, wherein the web pattern score comprises:

a first score line extending a first distance along the one of the first bottom flap, the second bottom flap, the third bottom flap, or the fourth bottom flap, wherein the first score line extends at a first angle away from either one of the first section score line, the second section score line, the third section score line, or the fourth section score line or an intersection of the panel score line and one of the first section score line, second section score line, third section score line or the fourth section score line; and a second score line extending a second distance along one of the first bottom flap, the second bottom flap, the third bottom flap, or the fourth bottom flap, wherein the second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line, wherein the second angle is less than the first angle such that the first score line and the second score line form a web-like pattern that includes a first subsection between the second score line and one of the first section score line, the second section score line, the third section score line, or the fourth section score line and a second subsection between the first score line and the second score line, wherein the web pattern score enables folding such that the first subsection folds towards the second subsection when the box blank is being formed into the box, wherein each of the first bottom flap, the second bottom flap, the third bottom flap, and the fourth bottom flap are folded along the panel score line to form a bottom web, wherein the bottom web is continuous; and wherein the at least one second score line extends to an outer edge of the one of the first bottom flap, the second bottom flap, the third bottom flap, or the fourth bottom flap.

21. A box blank for a box, the box blank comprising:

a first section comprising at least a first panel and a first bottom flap connected along a first portion of a panel score line;

a second section comprising at least a second panel and a second bottom flap connected along a second portion of the panel score line, wherein the first section and the second section are connected along a first section score line;

a third section comprising at least a third panel and a third bottom flap connected along a third portion of the panel sore line, wherein the second section and the third section are connected along a second section score line;

a fourth section comprising at least a fourth panel and a fourth bottom flap connected along a fourth portion of the panel score line, wherein the third section and the fourth section are connected along a third section score line;

a connecting flap comprising at least one of a connecting flap panel or a connecting flap bottom connected along a flap portion of the panel score line, wherein the flap is connected to either the first section or the fourth section along a fourth section score line;

wherein each of the panel score line, the first section score line, the second section score line, the third section score line and the fourth section score line are foldable;

wherein the panel score line intersects each of the first section score line, the second section score line, the third section score line, and the fourth section score line; and at least one web pattern score extending in one of the first bottom flap, the second bottom flap, the third bottom flap, or the fourth bottom flap, wherein the web pattern score comprises:

a first score line extending a first distance along the one of the first bottom flap, the second bottom flap, the third bottom flap, or the fourth bottom flap, wherein the first score line extends at a first angle away from either one of the first section score line, the second section score line, the third section score line, or the fourth section score line or an intersection of the panel score line and one of the first section score line, second section score line, third section score line or the fourth section score line;

a second score line extending a second distance along one of the first bottom flap, the second bottom flap, the third bottom flap, or the fourth bottom flap, wherein the second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line, wherein the second angle is less than the first angle such that the first score line and the second score line form a web-like pattern that includes a first subsection between the second score line and one of the first section score line, the second section score line, the third section score line, or the fourth section score line and a second subsection between the first score line and the second score line, wherein the web pattern score enables folding such that the first subsection folds towards the second subsection when the box blank is being formed into the box; and a tab defined by at least one cut extending partially within the one of the first bottom flap, the second bottom flap, the third bottom flap or the fourth bottom flap, wherein the first score line extends to the at least one cut defining the tab.

22. A box blank for a box, the box blank comprising:

a first section comprising at least a first panel and a first bottom flap connected along a first portion of a panel score line;

a second section comprising at least a second panel and a second bottom flap connected along a second portion of the panel score line, wherein the first section and the second section are connected along a first section score line;

a third section comprising at least a third panel and a third bottom flap connected along a third portion of the panel sore line, wherein the second section and the third section are connected along a second section score line;

a fourth section comprising at least a fourth panel and a fourth bottom flap connected along a fourth portion of the panel score line, wherein the third section and the fourth section are connected along a third section score line;

a connecting flap comprising at least one of a connecting flap panel or a connecting flap bottom connected along a flap portion of the panel score line, wherein the flap is connected to either the first section or the fourth section along a fourth section score line;

wherein each of the panel score line, the first section score line, the second section score line, the third section score line and the fourth section score line are foldable;

wherein the panel score line intersects each of the first section score line, the second section score line, the third section score line, and the fourth section score line; and at least one web pattern score extending in one of the first bottom flap, the second bottom flap, the third bottom flap, or the fourth bottom flap, wherein the web pattern score comprises:

a first score line extending a first distance along the one of the first bottom flap, the second bottom flap, the third bottom flap, or the fourth bottom flap, wherein the first score line extends at a first angle away from either one of the first section score line, the second section score line, the third section score line, or the fourth section score line or an intersection of the panel score line and one of the first section score line, second section score line, third section score line or the fourth section score line;

a second score line extending a second distance along one of the first bottom flap, the second bottom flap, the third bottom flap, or the fourth bottom flap, wherein the second score line extends at a second angle away from at least one of: the first score line; one of the first section score line, the second section score line, the third section score line or the fourth section score line; or the intersection of the panel score line and one of the first section score line, the second section score line, the third section score line, or the fourth section score line, wherein the second angle is less than the first angle such that the first score line and the second score line form a web-like pattern that includes a first subsection between the second score line and one of the first section score line, the second section score line, the third section score line, or the fourth section score line and a second subsection between the first score line and the second score line, wherein the web pattern score enables folding such that the first subsection folds towards the second subsection when the box blank is being formed into the box; and wherein the web pattern score further comprises a hook defined by a through cut extending from the first score line and extending at least partially within the at least one bottom flap.

* * * * *